US009501749B1

(12) United States Patent
Narsky

(10) Patent No.: US 9,501,749 B1
(45) Date of Patent: Nov. 22, 2016

(54) CLASSIFICATION AND NON-PARAMETRIC REGRESSION FRAMEWORK WITH REDUCTION OF TRAINED MODELS

(71) Applicant: The MathWorks, Inc., Natick, MA (US)

(72) Inventor: Ilya Narsky, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 243 days.

(21) Appl. No.: 13/799,517

(22) Filed: Mar. 13, 2013

Related U.S. Application Data

(60) Provisional application No. 61/610,657, filed on Mar. 14, 2012.

(51) Int. Cl.
  *G06F 15/18* (2006.01)
  *G06N 99/00* (2010.01)
  *G06N 7/02* (2006.01)

(52) U.S. Cl.
  CPC ............ *G06N 99/005* (2013.01); *G06N 7/023* (2013.01)

(58) Field of Classification Search
  None
  See application file for complete search history.

(56) References Cited

U.S. PATENT DOCUMENTS

| | | | |
|---|---|---|---|
| 7,792,770 B1 * | 9/2010 | Phoha et al. | 706/45 |
| 2009/0083680 A1 * | 3/2009 | McConaghy et al. | 716/3 |
| 2011/0022550 A1 * | 1/2011 | Pennacchiotti et al. | 706/12 |
| 2011/0246262 A1 * | 10/2011 | Pepper et al. | 705/12 |
| 2014/0161362 A1 * | 6/2014 | Cao | G06K 9/6202 382/224 |

OTHER PUBLICATIONS

Book Review: C4.5 Programming for MAchine Learning, Steven Salzberg, Machine Learning, 16 pp. 235-240, 1994, Kluwer Academic Publishers.*
Measures of Diversity in Classifier Ensembles and Their Relationship with the Ensemble Accuracy, Ludmila Kuncheva, Machine Learning, 51, 181-207, 2003, Kluwer Academic Publishers.*
Yang "Classifiers selection for ensemble learning based on accuracy and diversity" Procedia Engineering 15 (2011) 4266-4270.*
"When to choose which machine learning classifier?" (http://stackoverflow.com/questions/2595176/when-to-choose-which-machine-learning-classifier, pp. 2.*
Schapire, "The Strength of Weak Learnability," Machine Learning, vol. 5, 1990, pp. 197-227.
Freund et al., "A Decision-Theoretic Generalization of On-Line Learning and an Application to Boosting," Journal of Computer and System Sciences, vol. 55, Article No. SS971504, 1997, pp. 119-139.
Breiman, "Arcing Classifiers," The Annals of Statistics, vol. 26, No. 3, 1998, pp. 801-849.
Drucker et al., "Boosting Performance in Neural Networks," International Journal of Pattern Recognition and Artificial Intelligence, vol. 7, No. 4, 1993, pp. 705-719.

(Continued)

*Primary Examiner* — Li-Wu Chang
(74) *Attorney, Agent, or Firm* — Harrity & Harrity, LLP

(57) ABSTRACT

A device receives selection of a classification and regression framework, and receives training data for the classification and regression framework. The device applies the training data to the classification and regression framework to generate a trained model, and monitors performance of the trained model. The device inspects a structure of the trained model, and reduces a size of the trained model. The device generates an object based on the trained model, and provides the object for display.

20 Claims, 17 Drawing Sheets

(56) References Cited

OTHER PUBLICATIONS

Crammer et al., "Kernel Design Using boosting," Advances in Neural Information Processing Systems, vol. 15, 2003, pp. 537-544.
Bi et al., "Column-Generation Boosting Methods for Mixture of Kernels," Proceedings of the tenth ACM SIGKDD international conference on Knowledge discovery and data mining, 2004, pp. 521-526.
Buhlmann et al., "Discussion. Additive logistic regression: A statistical view of boosting, by Friedman, J. Hastie, T., and Tibshirani, R.," The Annals of Statistics, vol. 28, 2000, 10 pages.
Yang et al., "Studies of Boosted Decision Trees for MiniBooNE Particle Identification," Nuclear Instruments and Methods in Physics Research A 555, Sep. 16, 2005, pp. 370-385.
Buja et al., "Response to Mease and Wyner, Evidence Contrary to the Statistical View of Boosting," Journal of Machine Learning Research, vol. 9, 2008, pp. 165-170.
Schapire et al., "Boosting the Margin: A New Explanation for the Effectiveness of Voting Methods," The Annals of Statistics, vol. 26, No. 5, Oct. 1998, pp. 1651-1686.
Ratsch et al., "Efficient Margin Maximizing with Boosting," 2005, The Journal of Machine Learning Research 6, 2005, pp. 2131-2152.
Friedman et al., "Additive logistic regression: A statistical view of boosting," The Annals of Statistics, vol. 28, No. 2, 2000, pp. 337-407.
Friedman, "Greedy Function Approximation: A Gradient Boosting Machine," The Annals of Statistics, vol. 29, No. 5, 2001, pp. 1189-1232.
Kivinen et al., "Boosting as Entropy Projection," In Proceedings of the 12$^{th}$ Annual Conference on Computational Learning Theory, 1999, pp. 134-144.
Warmuth et al., "Totally Corrective Boosting Algorithms that Maximize the Margin," Proceedings of the 23rd International Conference on Machine Learning, vol. 148, 2006, pp. 1001-1008.
Meir et al., "An Introduction to Boosting and Leveraging," Advanced Lectures on Machine Learning, 2003, pp. 118-183.
Bauer et al., "An Empirical Comparison of Voting Algorithms: Bagging, Boosting and Variants," Machine Learning, vol. vv, 1998, pp. 1-38.
Long et al., "Random Classification Noise Defeats All Convex Potential Boosters," Proceedings of the 25th International Conference on Machine Learning, 2008, pp. 608-615.
Rosset, "Robust Boosting and its Relation to Bagging," Proceedings of the eleventh ACM SIGKDD International Conference on Knowledge Discovery in Data Mining, Aug. 21-24, 2005, pp. 249-255.
Nock et al., "A Robust Boosting Algorithm," Proceedings of the 13th European Conference on Machine Learning, 2002, pp. 319-330.
Freund, "An Adaptive Version of the Boost by Majority Algorithm," Machine Learning, 43, 2001, pp. 293-318.
Freund, "A more robust boosting algorithm," Computer Science and Engineering, UCSD, arXiv:0905.2138v1 [stat.ML], May 13, 2009, 9 pages.
Freund et al., "Discussion of the paper 'Arcing Classifiers," The Annals of Statistics, vol. 26, No. 3, 1998, pp. 824-832.
Breiman, "Prediction Games and Arcing Algorithms," Neural Computation, vol. 11, No. 7, 1999, pp. 1493-1517.
Mease et al., "Evidence Contrary to the Statistical View of Boosting," Journal of Machine Learning Research, vol. 9, 2008, pp. 131-156.
Friedman et al., "Predictive Learning Via Rule Ensembles," The Annals of Applied Statistics, vol. 2, No. 3, 2008, pp. 916-954.
Zhou et al., "Selective Ensemble of Decision Trees," Lecture Notes in Computer Science, Proceedings of the 9$^{th}$ International Conference on Rough Sets, Fuzzy Sets, Data Mining, and Granular Computing, 2003, pp. 476-483.
Krieger et al., "Boosting Noisy Data," Proceedings of the Eighteenth International Conference on Machine Learning, 2001, pp. 274-281.
Zhang et al., "An efficient modified boosting method for solving classification problems," Zhang, Journal of Computational and Applied Mathematics, vol. 214, 2008, pp. 381-392.
Buhlmann et al., "Boosting Algorithms: Regularization, Prediction and Model Fitting," Statistical Science, vol. 22, No. 4, 2007, pp. 477-505.
Buhlmann, "Boosting for High-Dimensional Linear Models," The Annals of Statistics, vol. 34, No. 2, 2006, pp. 559-583.
Cornillon et al., "Recursive Bias Estimation and $L_2$ Boosting," Submitted to the Annals of Statistics, arXiv:0801.4629v1 [stat.ME], http://arxiv.org/pdf/0801.4629.pdf, 2008, 33 pages.
Schapire et al., "Improved Boosting Algorithms Using Confidence-Rated Predictions," Machine Learning, vol. 37, 1999, pp. 297-336.
Wang et al., "Asymmetric Real Adaboost," 19$^{th}$ International Conference on Pattern Recognition, 2008, 4 pages.
Duffy et al., "Boosting Methods for Regression," Machine Learning, vol. 47, 2002, pp. 153-200.
Lazarevic et al., "Boosting Algorithms for Parallel and Distributed Learning," Distributed and Parallel Databases, vol. 11, 2002, pp. 203-229.
Yu et al., "Parallelizing Boosting and Bagging," http://citeseerx.ist.psu.edu/viewdoc/download?doi=10.1.1.29.1551&rep=rep1&type=pdf, 2001, 23 pages.
Hastie et al., "The Elements of Statistical Learning: Data Mining, Interface, and Prediction," The Springer Series in Statistics, Second Edition, Stanford University, 2001, 758 pages.
Friedman et al., "Pathwise Coordinate Optimization," The Annals of Applied Statistics, vol. 1, No. 2, 2007, pp. 302-332.
Bottou et al., "Support Vector Machine Solvers" Available at http://citeseerx.ist.psu.edu/viewdoc/download?doi=10.1.1.64.4209&rep=rep1&type=pdf, 2003, 27 pages.
Breiman, "Bagging Predictors," Machine Learning, vol. 24, 1996, pp. 123-140.
Breiman, "Random Forests," Machine Learning, vol. 45, 2001, pp. 5-32.
Breiman et al., "Random Forests," http://www.stat.berkeley.edu/~breiman/RandomForests/, 2013, 1 page.
Hsu et al., "A Practical Guide to Support Vector Classification," Available at http://www.csie.ntu.edu.tw/~cjlin/papers/guide/guide.pdf, Apr. 15, 2010, 16 pages.
Zadrozny et al., "Cost-Sensitive Learning by Cost-Proportionate Example Weighting," Available at http://www.research.ibm.com/people/n/nabe/icdm03ZLA.pdf, 2003, 8 pages.
Zhou et al., "On Multi-Class Cost-Sensitive Learning," Available at http://cse.seu.edu.cn/people/xyliu/publication/aaai06.pdf, 2006, 6 pages.
Breiman et al., "Classification and Regression Trees," Chapman & Hall, 1993, 358 pages.
Cristianini et al., "An Introduction to Support Vector Machines and Other Kernel-Based Learning Methods," Cambridge University Press, 2000, 189 pages.

\* cited by examiner

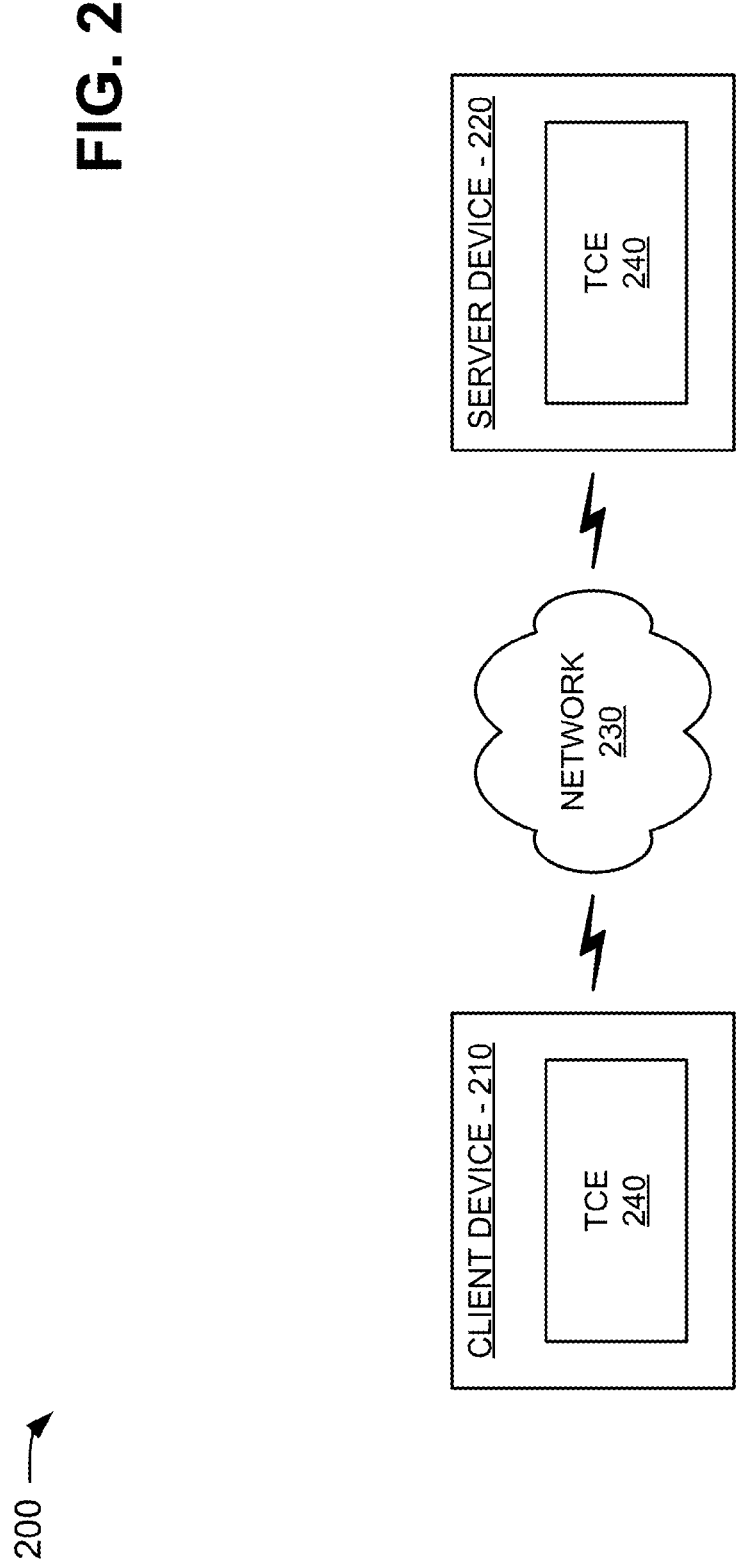

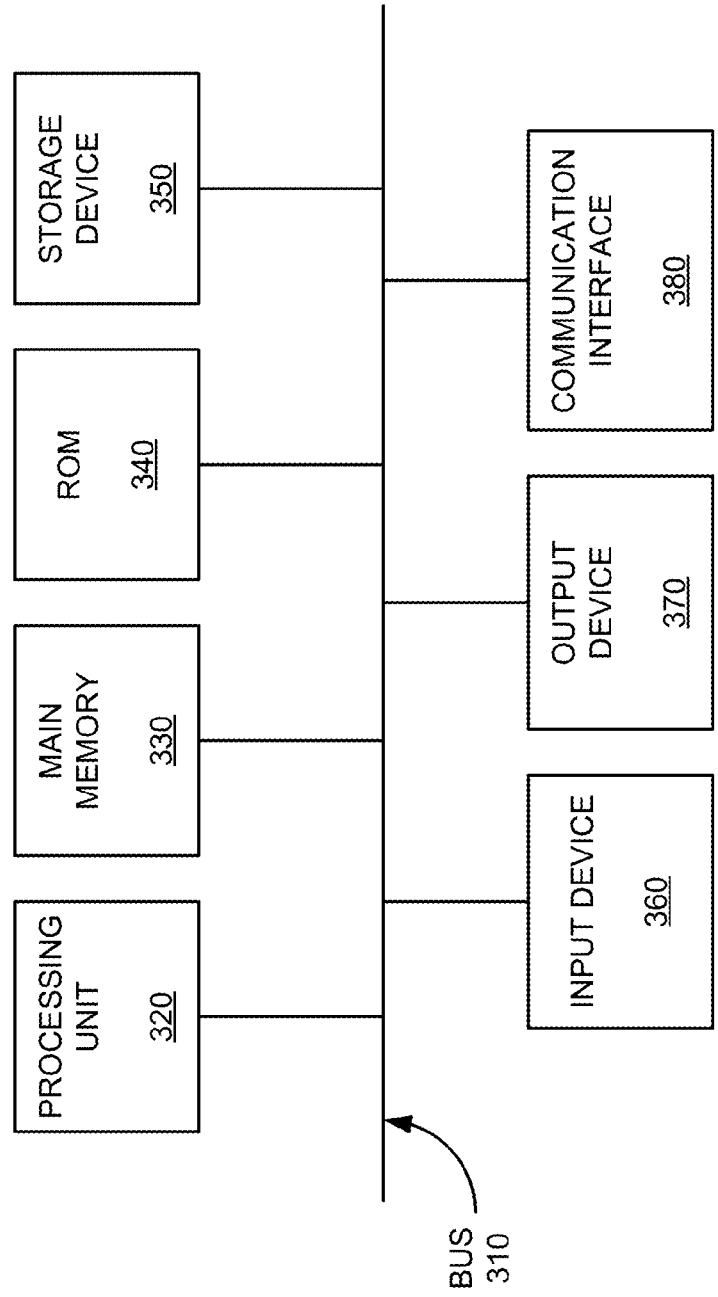

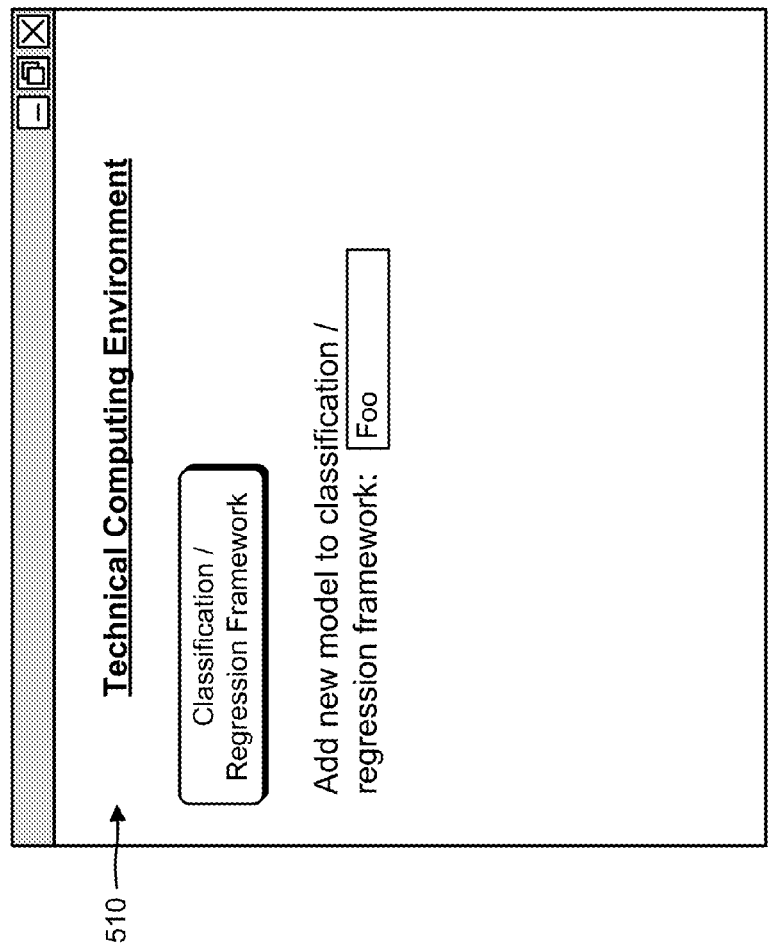

FIG. 5B

Technical Computing Environment

```
properties(GetAccess=public,SetAccess=protected)
    TrainedFooConfig = [];
end methods(Hidden)
    function this = CompactClassificationFoo(dataSummary,classSummary,...
            scoreTransform,trainedFooConfig)
        this = this@ClassificationModel(dataSummary,classSummary,scoreTransform);
        this.TrainedFooConfig = trainedFooConfig;
    end
end methods(Hidden)
    function s = score(this,X,varargin)
    end
```

520

500

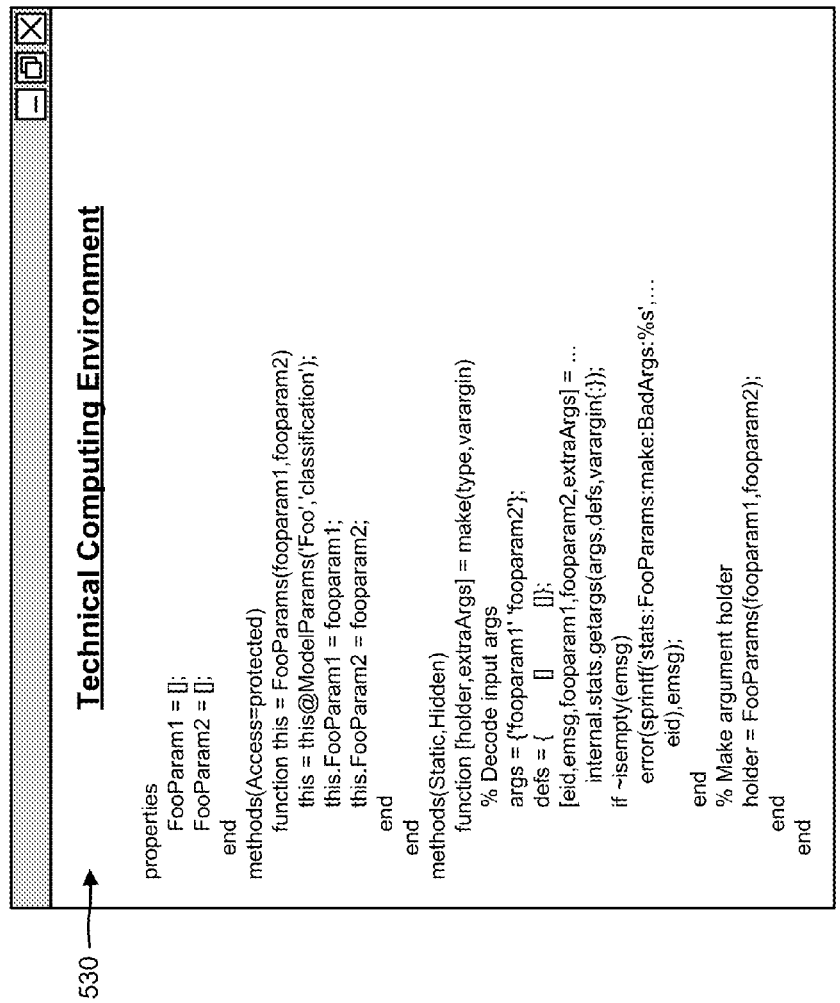

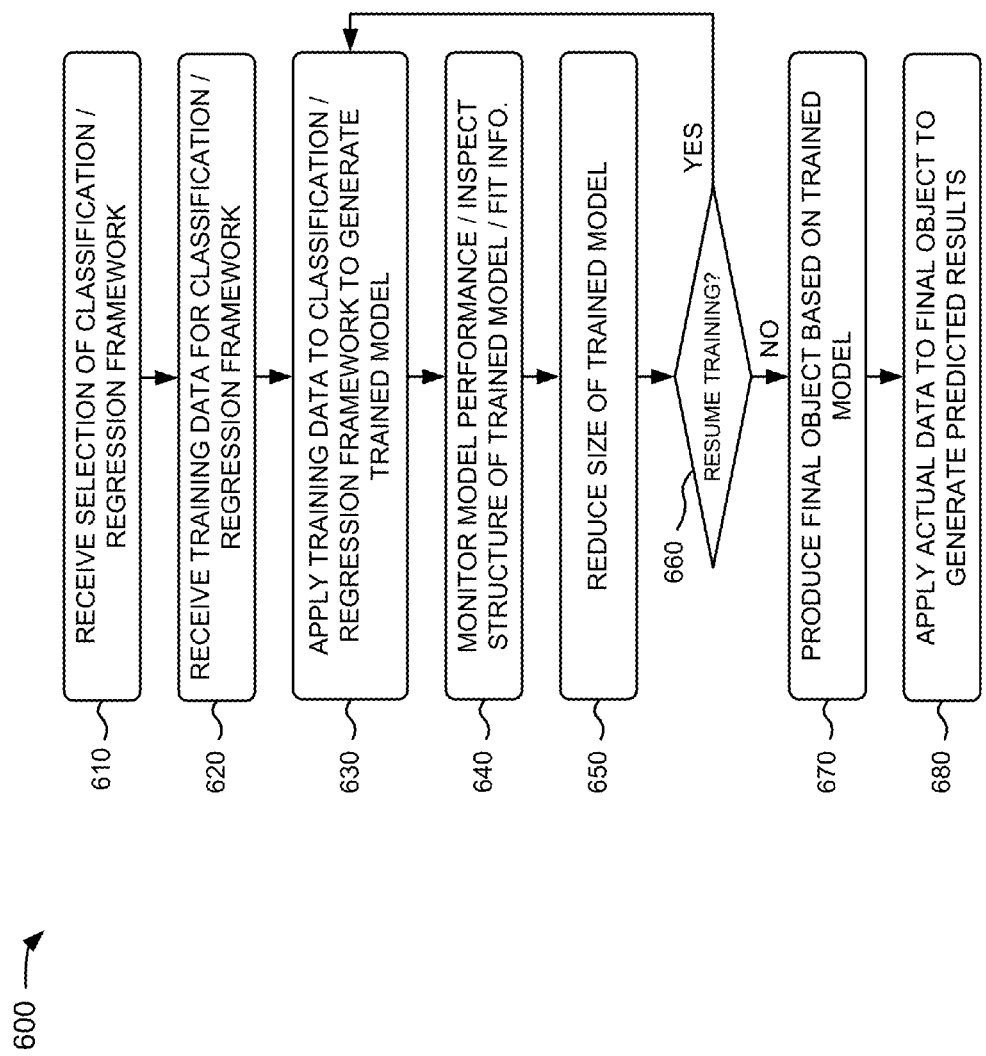

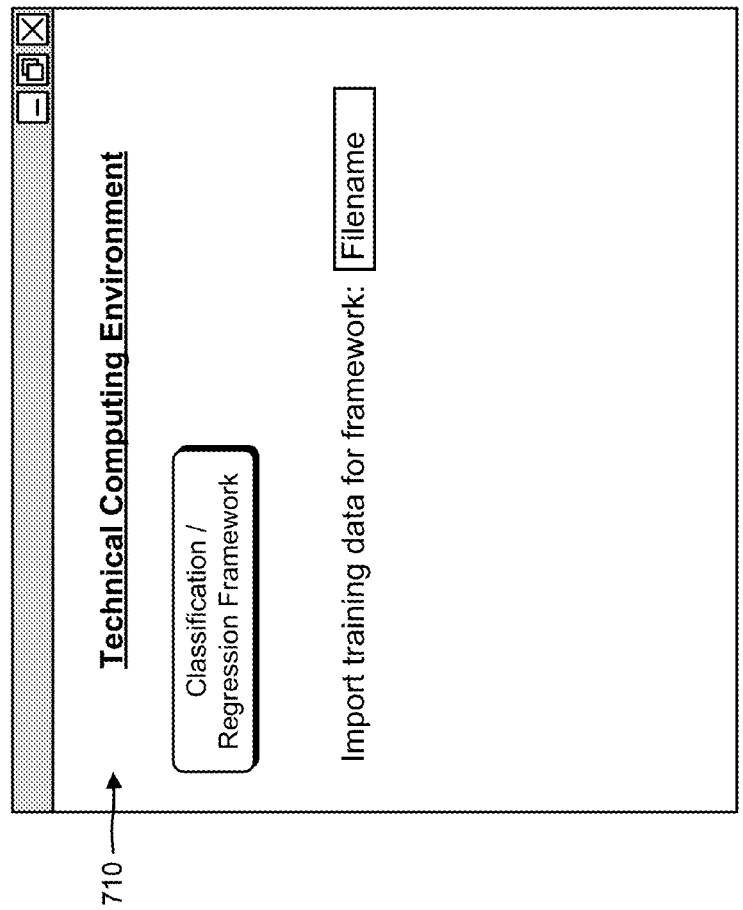

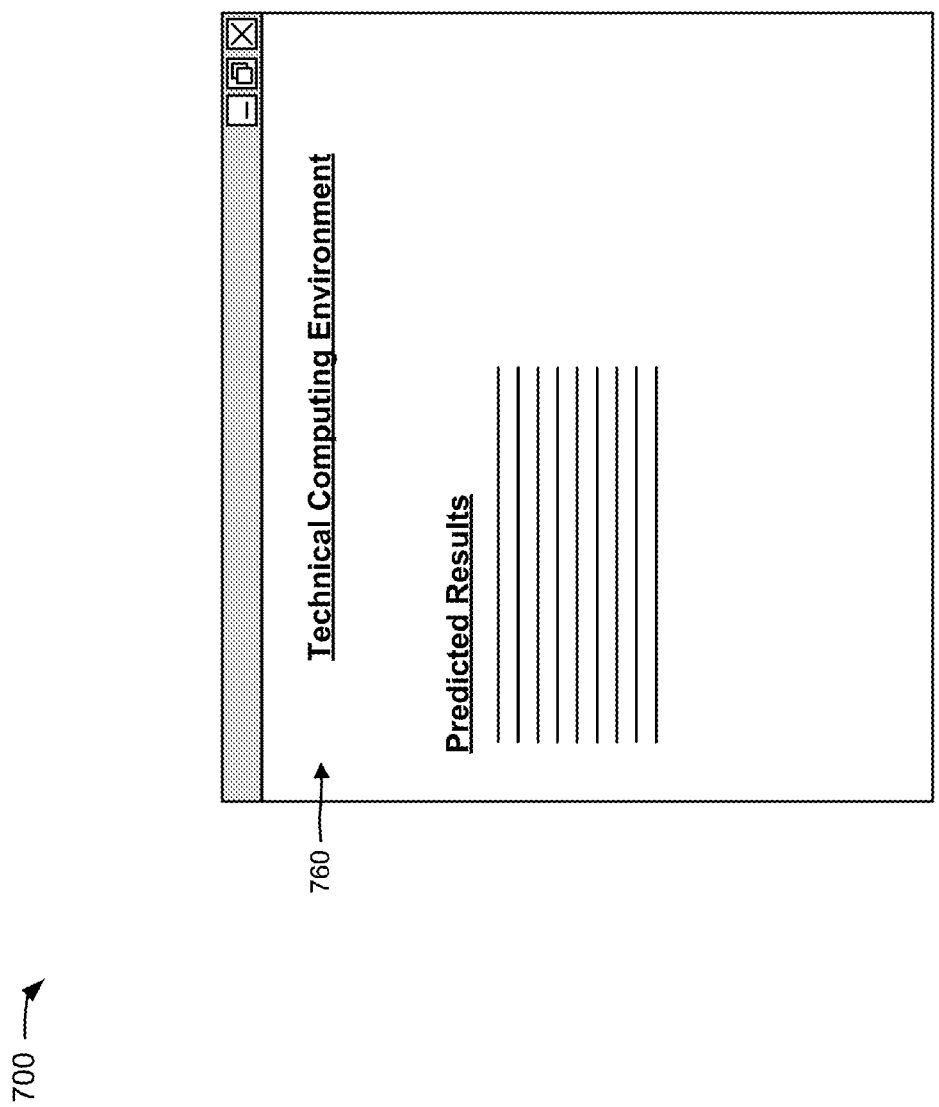

ns, the classification/regression framework may inspect a structure of the trained model (e.g., a decision tree structure) and/or fit
CLASSIFICATION AND NON-PARAMETRIC REGRESSION FRAMEWORK WITH REDUCTION OF TRAINED MODELS

RELATED APPLICATION

This application claims priority under 35 U.S.C. §119 based on U.S. Provisional Patent Application No. 61/610,657, filed Mar. 14, 2012, the disclosure of which is incorporated by reference herein in its entirety.

BRIEF DESCRIPTION OF THE DRAWINGS

The accompanying drawings, which are incorporated in and constitute a part of this specification, illustrate one or more implementations and, together with the description, explain these implementations. In the drawings:

FIG. 2 is a diagram of an example environment in which systems and/or methods described herein may be implemented;

FIG. 3 is a diagram of example components of one or more of the devices of the environment depicted in FIG. 2;

FIG. 4 is a flow chart of an example process for extending a classification and regression framework;

FIGS. 5A-5F are diagrams of an example of the process described in connection with FIG. 4;

FIG. 6 is a flow chart of an example process for creating an object with a classification and regression framework; and FIGS. 7A-7F are diagrams of an example of the process described in connection with FIG. 6.

DETAILED DESCRIPTION

The following detailed description refers to the accompanying drawings. The same reference numbers in different drawings may identify the same or similar elements.

Supervised learning algorithms perform the task of searching through a hypothesis space to find a suitable hypothesis that will make good predictions for a particular problem. Even if the hypothesis space contains hypotheses that are well-suited for the particular problem, it may still be difficult to find a suitable hypothesis. Ensembles combine multiple hypotheses to ideally form a better hypothesis. In other words, an ensemble is a technique for combining many weak learners in an attempt to produce a strong learner. The term ensemble may refer to methods that generate multiple hypotheses using a same base learner.

An ensemble is a supervised learning algorithm because an ensemble can be trained and then used to make predictions. The trained ensemble, therefore, represents a single hypothesis. However, this single hypothesis is not necessarily contained within a hypothesis space of models from which the single hypothesis is built. Thus, ensembles may have more flexibility than functions represented by the ensembles.

Overview

Systems and/or methods described herein may provide a classification and non-parametric regression framework (referred to herein as "a classification/regression framework" or "a framework") that provides models for ensemble learning, classification, and/or non-parametric regression. The classification/regression framework may provide a common application programming interface (API) so that a user of the framework may provide training data to the framework. The classification/regression framework may utilize the training data to produce a final object for the user. The user may apply the final object to actual data in order to generate predicted results. The systems and/or methods may enable the user to add one or more new models to the classification/regression framework, and thus, extend the framework.

Figure 1:
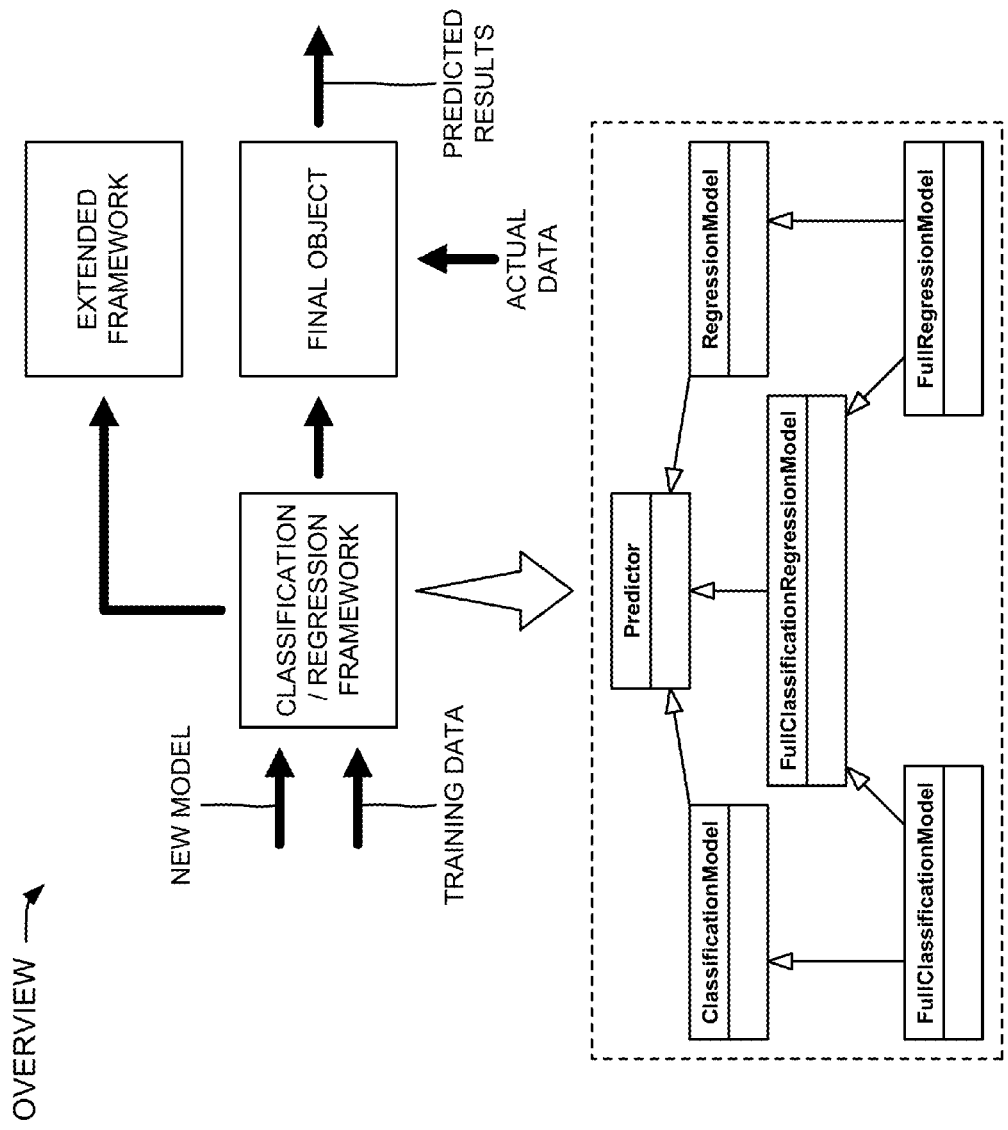
FIG. 1 is a diagram of an overview of an example implementation described herein.

FIG. 1 is a diagram of an overview of an example implementation described herein. For the overview, assume that a device (not shown in FIG. 1) includes a classification/regression framework that provides a common API to a user. In some implementations, the classification/regression framework may include a parent class or object (e.g., Predictor) for any model in the framework. The parent class may include two child classes (e.g., ClassificationModel and RegressionModel). The parent class and the two child classes may be compact classes. A compact class may store information needed to generate predictions when a model is applied to new data. For example, if the model is a decision tree, the stored information may include positions of decision splits.

Full models may include a full parent class (e.g., FullClassificationRegressionModel). The full parent class may include two child classes (e.g., FullClassificationModel and FullRegressionModel). One child class (e.g., FullClassificationModel) may be derived from the child class (e.g., ClassificationModel) and the full parent class (e.g., FullClassificationRegressionModel). Another child class (e.g., FullRegressionModel) may be derived from the child class (e.g., RegressionModel) and the full parent class (e.g., FullClassificationRegressionModel). The classes of the framework may be abstract and may not be constructed directly. The classes of the framework may serve as base classes for extending the framework with new models. A full class may store information inherited from a respective compact class, and may store information describing how the model is trained (or fitted), such as training data and model fit parameters selected by the user.

As further shown in FIG. 1, the classification/regression framework may receive a request (e.g., from a user) to add a new model to the framework. The classification/regression framework may create, based on the request, a first class that computes predictions of the new model for unknown data. The classification/regression framework may enable the user to create a second class that stores input parameters for the new model, and may enable the user to create a third class that builds the new model based on training data and/or class labels. The classification/regression framework may add the new model to a set of models of the framework, and may create a standalone model, for the new model, in the framework. The standalone model may be utilized for ensemble learning and/or cross-validation, and may modify the framework to produce an extended framework, as shown in FIG. 1.

The classification/regression framework, as further shown in FIG. 1, may receive training data. The training data may include data used to discover potentially predictive relationships. In statistical modeling, the training data may be used with a model in order to predict a response value from one or more predictors. The training data may be applied to the classification/regression framework in order to generate a trained model. The classification/regression framework may monitor performance of the trained model. The classification/regression framework may inspect a structure of the trained model (e.g., a decision tree structure) and/or fit information (e.g., errors generated by the trained model), and may reduce a size of the trained model (e.g., via pruning).

The training data may or may not be re-applied to the classification/regression framework. After the training data is or is not re-applied to the classification/regression framework, the framework may produce a final object based on the trained model, as further shown in FIG. 1. In some implementations, the final object may include a trained ensemble, a trained classifier, etc. As shown in FIG. 1, the user may provide actual data to the final object, and the final object may generate predicted results based on the actual data.

Such an arrangement may enable the user to quickly and easily create, via a common API, an object (e.g., a trained ensemble, a trained classifier, etc.) based on training data provided to the classification/regression framework. The arrangement may also enable the user to add one or more new models to the classification/regression framework, via an established architecture. The added new model(s) may create an extended classification/regression framework.

The terms code and program code, as used herein, are to be used interchangeably and are to be broadly interpreted to include text-based code that may require further processing to execute (e.g., C++ code, Hardware Description Language (HDL) code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

User interfaces, as described herein, may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

Example Environment Arrangement

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections.

Client device 210 may include one or more computation devices, such as, for example, a laptop computer, a personal computer, a tablet computer, a desktop computer, a workstation computer, a smart phone, a personal digital assistant (PDA), and/or other computation devices. In some implementations, client device 210 may include a TCE 240, described below.

Server device 220 may include one or more server devices, or other types of computation and communication devices. Server device 220 may include a device that is capable of communicating with client device 210 (e.g., via network 230). In some implementations, server device 220 may include one or more laptop computers, personal computers, workstation computers, servers, central processing units (CPUs), graphical processing units (GPUs), application-specific integrated circuits (ASICs), field-programmable gate arrays (FPGAs), etc. In some implementations, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

As indicated above, TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In some implementations, TCE 240 may provide these functions and/or tools using toolboxes (e.g., toolboxes for signal processing, image processing, data plotting, parallel processing, etc.). In some implementations, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240.

During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler. In some implementations, TCE 240 may include the classification/regression framework described herein.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Example Device Architecture

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device.

A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Example Process for Extending a Classification/Regression Framework

FIG. 4 is a flow chart of an example process 400 for extending a classification and regression framework. In some implementations, process 400 may be performed by client device 210 (e.g., TCE 240). In some implementations, process 400 may be performed by another device or a group of devices (e.g., server device 220) separate from or including client device 210. In some implementations, process 400 may be performed by client device 210 and a computing environment (e.g., a C++ computing environment) other than TCE 240.

As shown in FIG. 4, process 400 may include receiving a request to add a new model to a classification/regression framework (block 410). For example, client device 210/TCE 240 may provide for display a representation of the classification/regression framework. In some implementations, the representation of the classification/regression framework may include a mechanism (e.g., an icon, a button, a link, etc.) that may be selected by the user. When the mechanism is selected, client device 210/TCE 240 may provide an interface that enables the user to provide a request for adding a new model (e.g., a new weak learning model) to the classification/regression framework.

In some implementations, the framework may provide a uniform interface for an individual classifier (e.g., a single decision tree) and/or ensembles composed of many classifiers (e.g., an ensemble of decision trees). The framework may grow the ensembles by boosting or bagging. Every classifier in the framework may be used as a standalone learning model and as a weak learner for ensembles. For example, a single decision tree may be built by the framework, based on training data X and Y and using the syntax: tree=ClassificationTree.fit(X, Y). An ensemble of decision trees may be grown by using the syntax: ens=fitensemble(X, Y, ensalg, nlearn, 'Tree'), where ensalg may be one of several ensemble learning algorithms included in the framework, and nlearn may be a desired number of trees in the ensemble. The same syntax may extend to every classifier included in the framework.

In some implementations, if the user wants to integrate a new model (e.g., Foo) into the framework, client device 210/TCE 240 may create several new classes, as described below. Implementing the new classes may require considerably less effort than coding the new model from scratch. The framework may provide some or more all of the functionality for the new model by default. After the new classes are created, the new model may handle various types of classification labels, may recognize input arguments related to classification, may be cross-validated, may be used for ensemble learning, etc. The framework may provide such functionality for new model without requiring the user to code the functionality. Extending the framework with a new model may be thought of as filling slots in a template. After the user fills the slots, the user may utilize use the entire functionality of the framework for the new model.

As further shown in FIG. 4, process 400 may include creating, based on the request, a first class that computes predictions of the new model for unknown data (block 420). For example, the user, via client device 210/TCE 240, may create a first class that computes predictions of the new model for unknown data. In some implementations, client device 210/TCE 240 may derive the first class (e.g., CompactClassificationFoo) from ClassificationModel of the framework. The first class may be considered compact since objects of the first class may not store training data. However, the first class may store a trained configuration for the new model (e.g., Foo). For example, the first class may provide a hidden constructor and properties for storing the trained configuration of the new model. Parameters storing the trained configuration of the new model may be declared as properties of the first class.

In some implementations, client device 210/TCE 240 may provide a hidden method (e.g., CompactClassificationFoo/score) that generates an N-by-K matrix (s) for N observations and K classes. Client device 210/TCE 240 may compute the matrix (s) using the trained configuration. The matrix (s) may be used by the framework to predict class labels for observations in X. For example, a higher score for an observation may indicate a higher probability that the observation is part of the first class. In some implementations, client device 210/TCE 240 may provide model-specific properties and/or methods for the first class.

As further shown in FIG. 4, process 400 may include creating a second class that stores input parameters for the new model (block 430). For example, the user, via client device 210/TCE 240, may create a second class that stores input parameters for the new model (e.g., Foo). In some implementations, client device 210/TCE 240 may derive the second class (e.g., FooParams) from the framework (e.g., from ModelParams). The second class may store all input parameters needed to fully specify the new model before training. If the new model does not utilize input parameters, client device 210/TCE 240 may still create the second class, but the second class may not have any properties.

In some implementations, client device 210/TCE 240 may declare the input parameters as properties with public syntax (e.g., GetAccess and SetAccess), and may enable the user to set as many parameters and/or properties as desired. In some implementations, client device 210/TCE 240 may provide an input parameter method that may be used by the framework to set default input parameters if the user does not provide the input parameters. The default input parameters may depend on an input matrix of predictors (X), true class labels (Y), observation weights (W), a data structure (e.g., dataSummary) with fields (e.g., PredictorNames, CategoricalPredictors, and ResponseName), a data structure (e.g., classSummary) with fields (e.g., ClassNames, NonzeroProbClasses, Prior, and Cost), and a function handle (e.g., scoreTransform) for transforming classification scores produced by the new model from one range to another range.

Returning to FIG. 4, process 400 may include creating a third class that builds the new model based on training data and/or class labels (block 440). For example, the user, via client device 210/TCE 240, may create a third class that builds the new model (e.g., Foo) based on training data (e.g., a matrix of predictors (X)) and/or true class labels (Y). In some implementations, client device 210/TCE 240 may derive the third class (e.g., ClassificationFoo) from FullClassificationModel of the framework and from the first class (e.g., CompactClassificationFoo). The third class may be a full class, as opposed to a compact class, because objects of the third class may store training data X and Y. The third class may know how to train the new model based on the training data, and may store the training data (e.g., in a particular matrix of predictors X), the true class labels (Y), and observation weights (W). In some implementations, the third class may include model-specific properties and methods appropriate for a full object. These model-specific properties and methods may rely on the training data absent in a compact object.

As further shown in FIG. 4, process 400 may include adding the new model to a set of models of the classification/regression framework (block 450). For example, the user, via client device 210/TCE 240, may add the new model (e.g., Foo) to a set of models of the classification/regression framework. In some implementations, client device 210/TCE 240 may add the new model to particular functions (e.g., simpleModels.m, classificationModels.m, etc.) of the framework. The functions may contain names of the models known to the framework. At this point, the new model may be fitted using a fitted object (e.g., ClassificationFoo.fit), and may use the methods and properties of the fitted object.

Returning to FIG. 4, process 400 may include creating a standalone model, for the new model, in the classification/regression framework (block 460). For example, client device 210/TCE 240 may create a standalone model, based on the new model, in the classification/regression framework. In some implementations, client device 210/TCE 240 may add the standalone model to a particular function (e.g., weakLearners.m). This function may contain names of new models (e.g., added by users) that may be used for cross-validation and ensemble learning.

As further shown in FIG. 4, process 400 may include providing the standalone model for ensemble learning and/or cross-validation (block 470). For example, client device 210/TCE 240 may provide the standalone model for display to the user, and the user may utilize the standalone model for ensemble learning and/or cross-validation. In some implementations, client device 210/TCE 240 may store the standalone model (e.g., in storage device 350, FIG. 3). In some implementations, the standalone model may include the same architecture as existing classes in the classification/regression framework.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Example of Adding a New Model to the Classification/Regression Framework

Figure 5D:
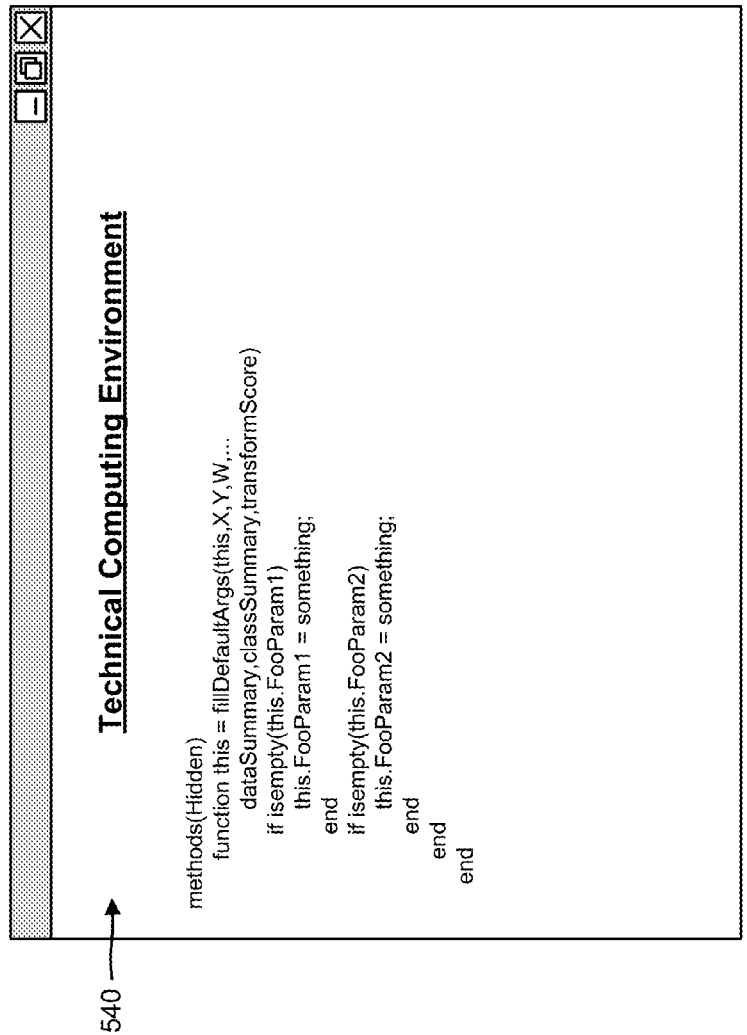

FIGS. 5A-5F are diagrams of an example 500 of the process described above with respect to FIG. 4. In example 500, assume that client device 210/TCE 240 provides a user interface 510 for display to a user, as shown in FIG. 5A. User interface 510 may include information associated with TCE 240 and a mechanism (e.g., a button, an icon, a link, etc.) that, when selected, provides access to the classification/regression framework. As further shown in FIG. 5A, user interface 510 may request that the user provide a name of new model to add to the classification/regression framework. In example 500, assume that the user provides the name "Foo" for the new model to add to the framework. Client device 210/TCE 240 may receive the request to add the new model (e.g., Foo) to the classification/regression framework.

Based on the request to add the new model (e.g., Foo), client device 210/TCE 240 may create a first class that computes predictions of the new model for unknown data. In some implementations, client device 210/TCE 240 may derive the first class (e.g., CompactClassificationFoo) from ClassificationModel of the framework. The first class may be considered compact since objects of the first class may not store training data. However, the first class may store a trained configuration for the new model (e.g., Foo). In some implementations, client device 210/TCE 240 may provide a hidden constructor and properties for storing the trained configuration of the new model as shown by a user interface 520 of FIG. 5B. As shown, the first class may include a data structure (e.g., dataSummary) with three fields (e.g., PredictorNames (variable names), CategoricalPredictors (indices of categorical variables), and ResponseName (name of the response variable)).

The first class may include another data structure (e.g., classSummary) with four fields (e.g., ClassNames (class names), NonzeroProbClasses (subset of classes in ClassNames with non-zero priors), Prior (class prior probabilities), and Cost (misclassification costs)). The first class may also include a function handle (e.g., scoreTransform) for transforming output of CompactClassificationFoo/predict. In some implementations, dataSummary, classSummary, and scoreTransform may be provided by the framework, without any user interaction. The first class may include a user-definable set of parameters (e.g., trainedFooConfig) that store the trained configuration of the new model. The parameters storing the trained configuration of the new model may be declared as properties of the first class.

As further shown in FIG. 5B, the first class may provide a hidden method (e.g., CompactClassificationFoo/score) that generates an N-by-K matrix (s) for N observations and K classes. Client device 210/TCE 240 may compute the matrix (s) using the trained configuration. The matrix (s) may be used by the framework to predict class labels for observations in X. For example, a higher score for an observation may indicate a higher probability that the observation is part of the first class. In some implementations, client device 210/TCE 240 may provide model-specific properties and/or methods for the first class.

In example 500, further assume that the user, via client device 210/TCE 240, creates a second class that stores input parameters for the new model (e.g., Foo). In some implementations, client device 210/TCE 240 may derive the second class (e.g., FooParams) from the framework (e.g., from ModelParams). The second class may store all input parameters needed to fully specify the new model before training. If the new model does not utilize input parameters, client device 210/TCE 240 may still create the second class, but the second class may not have any properties.

In some implementations, client device 210/TCE 240 may declare the input parameters as properties with public syntax (e.g., GetAccess and SetAccess), and may enable the user to set as many parameters and/or properties as desired. For example, as shown in a user interface 530 of FIG. 5C, client device 210/TCE 240 may declare the input parameters as properties with the syntax:

properties
        FooParam1=[ ];
        FooParam2=[ ];
    end.

As further shown in user interface of FIG. 5C, client device 210/TCE 240 may provide a protected constructor with the following syntax:

methods(Access protected)
        function this=FooParams(fooparam1,fooparam2)
            this=this@ModelParams('Foo','classification');
            this.FooParam1=fooparam1;
            this.FooParam2=fooparam2;
        end
    end.

As still further shown in user interface of FIG. 5C, client device 210/TCE 240 may provide a static hidden method (e.g., FooParams.make) with the following syntax:

```
methods (Static,Hidden)
    function [holder,extraArgs] = make(type,varargin)
        % Decode input args
        args = {'fooparam1' 'fooparam2'};
        defs = { [ ] [ ] };
        [eid,emsg,fooparam1 ,fooparam2,extraArgs] = ...
            internal.stats.getargs(args,defs,varargin{:});
        if ~isempty(emsg)
            error (sprintf('stats:FooParams:make:BadArgs:%s', ...
                eid), emsg);
        end
        % Make argument holder
        holder = FooParams(fooparam1 ,fooparam2);
    end
end.
```

In example 500, further assume that the user, via client device 210/TCE 240, provides an input parameter method, as shown in a user interface 540 of FIG. 5D, which may be used by the framework to set default input parameters if the user does not provide the input parameters. The default input parameters may depend on an input matrix of predictors (X), true class labels (Y), observation weights (W), a data structure (e.g., dataSummary) with fields (e.g., PredictorNames, CategoricalPredictors, and ResponseName), a data structure (e.g., classSummary) with fields (e.g., ClassNames, NonzeroProbClasses, Prior, and Cost), and a function handle (e.g., scoreTransform) for transforming classification scores produced by the new model from one range to another range.

In example 500, assume that the user, via client device 210/TCE 240, creates a third class that builds the new model (e.g., Foo) based on training data (e.g., a matrix of predictors (X)) and/or true class labels (Y). In some implementations, client device 210/TCE 240 may derive the third class (e.g., ClassificationFoo) from FullClassificationModel of the framework and from the first class (e.g., CompactClassificationFoo). The third class may be a full class, as opposed to a compact class, because objects of the third class may store training data X and Y. The third class may know how to train the new model based on the training data, and may store the training data (e.g., in a particular matrix of predictors X), the true class labels (Y), and observation weights (W).

Figure 5E:
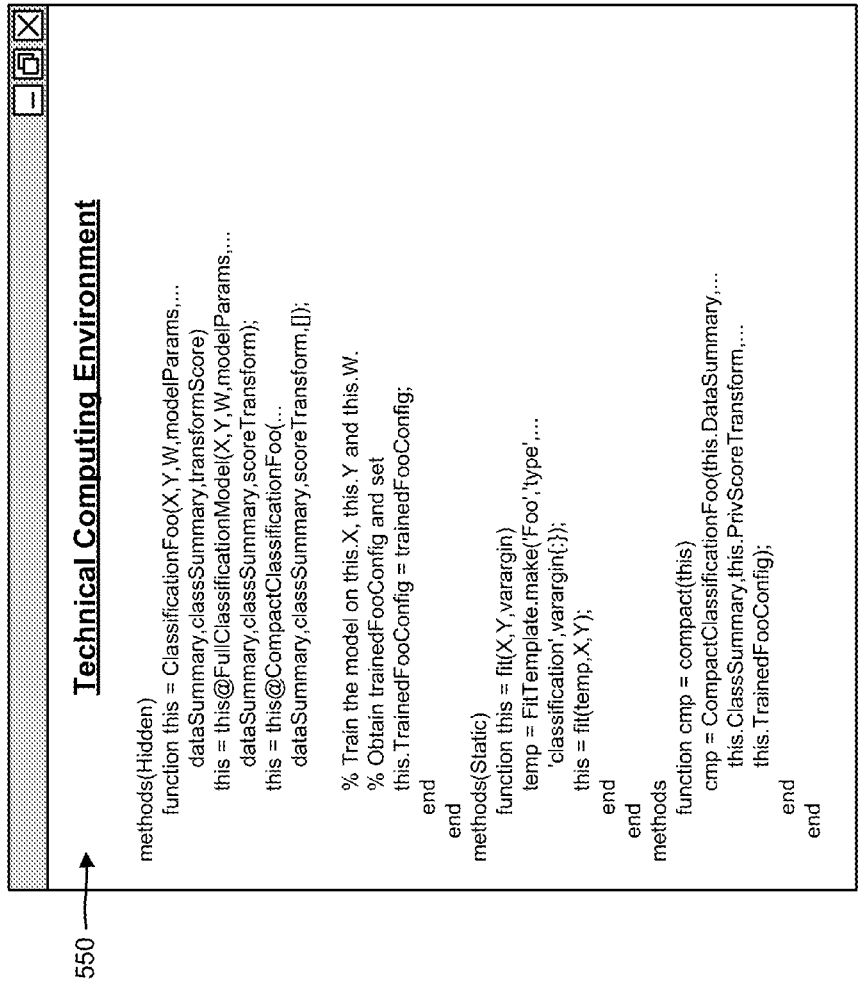

As shown in a user interface 550 of FIG. 5E, the third class may include a hidden constructor with the syntax:

```
methods(Hidden)
    function this = ClassificationFoo(X,Y,W,modelParams,...
        dataSummary, classSummary, transformScore)
        this = this@FullClassificationModel(X,Y,W,modelParams,...
            dataSummary,classSummary,scoreTransform);
        this = this@CompactClassificationFoo(...
            dataSummary,classSummary,scoreTransform,[ ]);
        % Train the model on this.X, this. Y and this. W.
        % Obtain trainedFooConfig and set
        this. TrainedFooConfig = trainedFooConfig;
    end
end.
```

As further shown in user interface 550 of FIG. 5E, the third class may include a static method (e.g., ClassificationFoo.fit) with the syntax:

```
methods(Static)
    function this = fit(X,Y,varargin)
        temp = FitTemplate.make('Foo','type',...
            'classification',varargin{:});
        this = fit(temp,X, Y);
    end
end.
```

As still further shown in FIG. 5E, the third class may include a public compact method with the following syntax:

```
methods
    function cmp = compact(this)
        cmp = CompactClassificationFoo(this.DataSummary,...
            this.ClassSummary,this.PrivScoreTransform,...
            this. TrainedFooConfig);
    end
end.
```

Figure 5F:
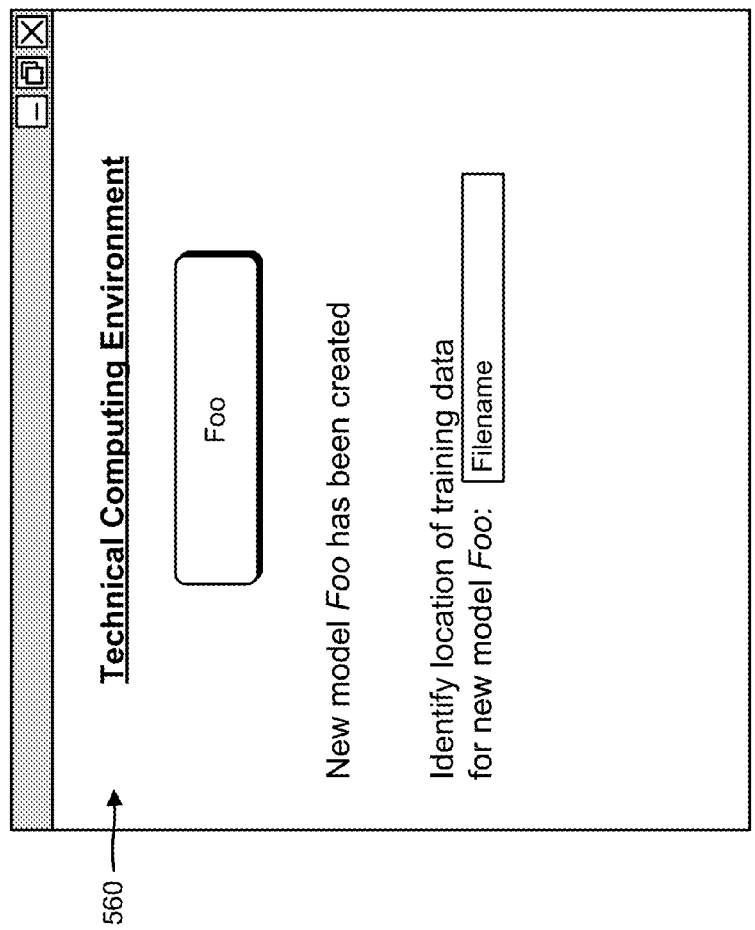

After the third class is created, client device 210/TCE 240 may add the new model (e.g., Foo), and the first, second, and third classes, to a set of models of the classification/regression framework. In some implementations, client device 210/TCE 240 may add the new model and the first-third classes to particular functions (e.g., simpleModels.m, classificationModels.m, etc.) of the framework. Client device 210/TCE 240 may create a standalone model, based on the new model and/or the first-third classes, in the classification/regression framework. In some implementations, client device 210/TCE 240 may add the standalone model to a particular function (e.g., weakLearners.m) of the framework. After the standalone model is created, client device 210/TCE 240 may provide a user interface 560 for display to the user, as shown in FIG. 5F. For example, user interface 560 may include a representation (e.g., a button, an icon, a link, etc.) of the standalone model (e.g., Foo) and an indication that the new model (e.g., Foo) has been created by the classification/regression framework. The user may utilize the standalone model for ensemble learning and/or cross-validation. For example, the user may identify a location of training data for the new model, via user interface 560 of FIG. 5F.

Example Process for Creating an Object with the Classification/Regression Framework FIG. 6 is a flow chart of an example process 600 for creating an object with the classification/regression framework. In some implementations, process 600 may be performed by client device 210 (e.g., TCE 240). In some implementations, process 600 may be performed by another device or a group of devices (e.g., server device 220) separate from or including client device 210. In some implementations, process 600 may be performed by client device 210 and a computing environment (e.g., a C++ computing environment) other than TCE 240.

As shown in FIG. 6, process 600 may include receiving selection of a classification/regression framework (block 610). For example, client device 210/TCE 240 may provide for display a representation of the classification/regression framework. In some implementations, the representation of the classification/regression framework may include a mechanism (e.g., an icon, a button, a link, etc.) that may be selected by the user. When the mechanism is selected, client device 210/TCE 240 may provide an interface that enables the user to provide training data to the classification/regression framework.

As further shown in FIG. 6, process 600 may include receiving training data for the classification/regression framework (block 620). For example, client device 210/TCE 240 may instruct the user to input training data for the classification/regression framework. Based on the instruction, the user may identify a location (e.g., in storage device 350, FIG. 3) of the training data to provide to the framework. In some implementations, the user may input (e.g., via keyboard) the training data to client device 210/TCE 240, may import the training data from a remote location (e.g., from server device 220), etc., and client device 210/TCE 240 may provide the training data to the framework.

As further shown in FIG. 6, process 600 may include applying the training data to the classification/regression framework to generate a trained model (block 630). For example, client device 210/TCE 240 may apply the training data to the classification/regression framework. The framework may utilize the training data to generate a trained model. In some implementations, the framework may train a simple learner by calling a static fit method of a respective class. For example, the framework may grow a decision tree for classification with the syntax: obj=ClassificationTree.fit (X,Y,varargin), where obj may include a full object to be used for operations on the trained model, X may include a double or single matrix of predictors, and Y may include a vector of response values. Static fit methods may return objects of the same type as a class owning the static method (e.g., obj may have type ClassificationTree).

In some implementations, the framework may grow a decision tree for regression with the syntax: obj=RegressionTree.fit(X,Y,varargin), where Y may be of numeric type, and obj may be of type RegressionTree. If the trained model can be used for either classification or regression, the framework may provide two classes for the trained model: ClassificationXXX and RegressionXXX. Before the model is trained, the framework may perform various checks and preparatory work on input data and model parameters.

In some implementations, the framework may train an ensemble by calling a fitensemble function, such as: obj=fitensemble(X,Y,method,nlearn,learners,varargin), where obj may include a full object to be used for operations on the trained model; X may include a double or single matrix of predictors; Y may include a vector of response values; method may include a name of the model to be trained; learners may include a cell array of weak learner templates, a single weak learner template, a string with the name of the weak learner; and nlearn may include a number of ensemble iterations to be performed. The number of weak learners grown by the ensemble may be determined as a product of nlearn and the length of learners.

The framework may train the ensemble by creating weak learner templates and growing an ensemble using the templates. For example, static template methods may produce objects of class FitTemplate. The FitTemplate object may include a set of input parameters to be supplied to the weak learner constructor.

Returning to FIG. 6, process 600 may include monitoring performance of the trained model and inspecting a structure of the trained model and/or fit information (block 640). For example, the framework may inspect performance of the trained model based on training, cross-validation, out-of-bag, independent, etc. test data. In some implementations, the framework may monitor performance of the trained model based on unseen data. In some implementations, the framework may provide methods for monitoring a quality of the trained model based on training data and variants of the training data, such as cross-validated data and out-of-bag data.

In some implementations, the framework may inspect a structure of the trained model (e.g., a decision tree structure) and/or fit information (e.g., errors produced by weak hypotheses). For example, the framework may inspect full objects, compact objects, classification objects, and regression objects associated with the trained model. Public properties of a compact object may be included as a subset of public properties of a respective full object. In some implementations, the framework may inspect public properties of compact objects, public properties of full objects, public properties and methods for decision trees, public properties and methods for ensembles, public properties for cross-validated models, etc.

As further shown in FIG. 6, process 600 may include reducing a size of the trained model (block 650). For example, the framework may reduce a size of the trained model by shrinking (or pruning) the trained model. In some implementations, the framework may provide pruning for regression ensembles by a lasso technique. The framework may add methods (e.g., regularize, shrink, and cvshrink) and a property (Regularization) to the class for full regression ensembles (RegressionEnsemble). For example, the framework may grow a regression ensemble and the Regularization property may be empty. The framework may execute the regularize method to fit for optimal learner weights by the lasso technique. Based on execution of the regularize method, the framework may obtain a full regression ensemble and the Regularization property may be filled. The framework may execute the shrink method to reduce the ensemble size by removing learners with optimized weights below a certain threshold. Based on the execution of the shrink method, the framework may obtain a compact regression ensemble. In some implementations, the executions of the regularize method and the shrink method may be replaced with a single call to the shrink method. In this case, the regularize method may be called by the shrink method internally, but the optimized weights may not be stored. In some implementations, the framework may add methods (e.g., regularize, shrink, and cvshrink) and a property (Regularization) to the class for classification ensembles.

Returning to FIG. 6, process 600 may include determining whether to resume training of the model (block 660). If training is to be resumed on the model (block 660—YES), process 600 may return to block 630. For example, the framework may determine whether to resume training on the trained model after reducing the size of the trained model. If the framework determines that training is to be resumed on the trained model, the framework may re-perform the functionality described above in connection with blocks 630-

650. In some implementations, the framework may train an ensemble and may grow a few weak learners. After growing the few weak learners, the framework may stop, may inspect the performance of the trained ensemble, and may resume training of the ensemble if the performance does not satisfy particular criteria.

As further shown in FIG. 6, if training is not to be resumed on the model (block 660—NO), process 600 may include producing a final object based on the trained model (block 670). For example, if the framework determines that training is not to be resumed on the trained model, the framework may output a final object based on the trained model. In some implementations, client device 210/TCE 240 may output a representation (e.g., a button, a block, an icon, a link, etc.) of the final object that, when selected, may cause client device 210/TCE 240 to provide access to the final object. The user may then utilize the final object (e.g., to provide actual data to the final object).

Returning to FIG. 6, process 600 may include applying the final object to actual data to generate predicted results (block 680). For example, client device 210/TCE 240 may request that the user identify or provide actual data for the final object. The user may identify or provide the actual data to client device 210/TCE 240, and client device 210/TCE 240 may apply the final object to the actual data. The final object may process the actual data to produce predicted results. Client device 210/TCE 240 may provide the predicted results for display to the user. For example, if the user inputs signaling information as the actual data, the final object may generate predicted signals included in the signaling information and predicted background noise included in the signaling information. Thus, the final object may provide a mechanism for the user to predict signals and/or background noise in signaling information. In some implementations, client device 210/TCE 240 may store the final object and/or the predicted results (e.g., in storage device 350, FIG. 3).

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Example Creation of an Object with the Classification/Regression Framework

Figure 7B:
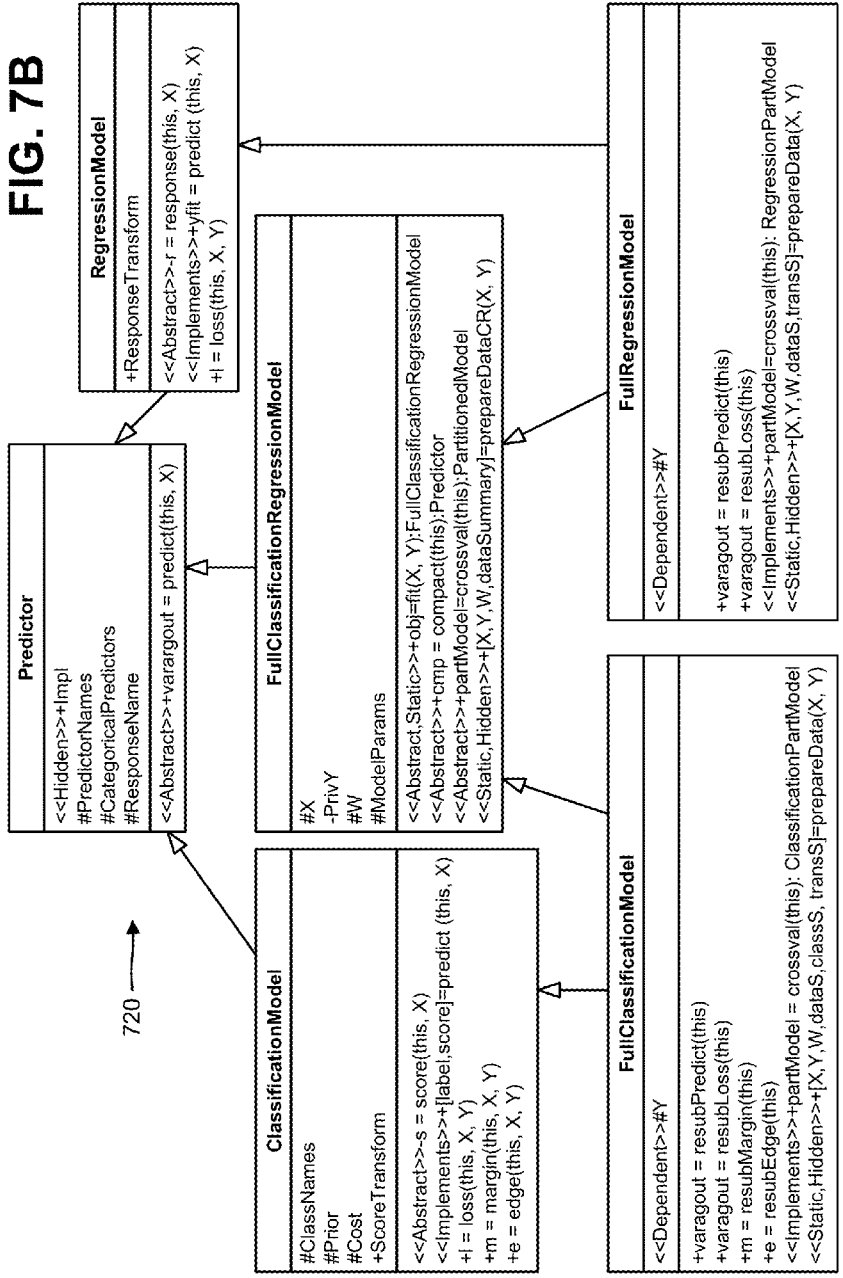

FIGS. 7A-7F are diagrams of an example 700 of the process described above with respect to FIG. 6. In example 700, assume that client device 210/TCE 240 provides a user interface 710 for display to a user, as shown in FIG. 7A. User interface 710 may include information associated with TCE 240 and a mechanism (e.g., a button, an icon, a link, etc.) that, when selected, provides access to the classification/regression framework. As further shown in FIG. 7A, user interface 710 may request that the user import training data to the classification/regression framework. In example 700, assume that the user provides a location of a filename associated with training data to be imported to the framework. Client device 210/TCE 240 may receive the location of the filename, and may import the training data to the classification/regression framework.

Client device 210/TCE 240 may apply the training data to the classification/regression framework. In some implementations, the classification/regression framework may include the classes in FIG. 7B, as indicated by reference number 720. As shown, the framework may include a predictor class (e.g., Predictor), a regression model class (e.g., RegressionModel), a classification model class (e.g., ClassificationModel), a full classification regression model class (e.g., FullClassificationRegressionModel), a full regression model class (e.g., FullRegressionModel), and a full classification model class (e.g., FullClassificationModel).

The predictor class may include a base class of the framework and may include a hidden property (e.g., Impl). The Impl property may include an object that implements a prediction part for the prediction class. Most models may be used for either classification or regression, and the Impl property may be shared between the classification and regression parts. If a user wants to extend the framework with a new model, the user may provide a class that implements the Impl property. For some models it may not be necessary to have a predictor class. For example, a model may be used for classification only and nothing may be shared with a regression class. In that case, the user may implement a compact class derived from ClassificationModel or RegressionModel directly without the predictor class.

The predictor class may be a super-class that defines a base interface for all objects visible to the user. The Impl property may encapsulate code shared by classification and regression parts of a same algorithm. In some implementations, the Impl property may be pushed down into concrete classes. The predictor class may include an abstract method (e.g., predict) that users may utilize to make predictions. The predict method may be provided by ClassificationModel/predict and RegressionModel/predict, which may be implemented using ClassificationModel/score and RegressionModel/response, respectively. ClassificationModel/score and RegressionModel/response may include abstract protected methods defined in concrete classes, such as CompactClassificationEnsemble.

The abstract protected methods may compute raw predictions from a model. For classification, the raw predictions may include an N-by-K matrix of scores for N observations and K classes. For regression, the raw predictions may include a vector of size N. Declaring the abstract protected methods therefore may not impose any requirements on classes derived from ClassificationModel and RegressionModel. The predictor class may include additional properties (e.g., PredictorNames, CategoricalPredictors, and ResponseName). The additional properties may include dependent properties bundled in a data structure (e.g., DataSummary).

The regression model class may include a property (e.g., ResponseTransform) for transforming the raw predictions of the model to an expected range. In some implementations, the regression model class may be set to an identity transformation. The regression model class may be implemented with the following syntax:
  function yfit=predict(this,X,varargin)
  Yfit=this.PrivResponseTransform(response(this,X,varargin{:}));
  end.
The regression model class may include a property (e.g., loss). The loss property may include a sum of argument checking, a call to predict, and a call to a function handle that computes the loss (e.g., funloss). The loss property may be implemented with the following syntax:
  function l=loss(this, X, Y, varargin)
  Yfit=predict(this, X, extraArgs{:});
  l=funloss(Y, Yfit, W);
  end.

This loss property may be used to compute user-defined loss for a model. The function handle (e.g., funloss) and W may include defaults and may be passed as optional arguments. Y may include a vector of true values, Yfit may include a vector of fitted values, W may include observation weights, and extraArgs may include arguments.

The classification model class may include a property (e.g., ScoreTransform) that may be set by the user to available transformations. The available transformations may depend on a range of predictions provided by the model and on a range desired by the user. The ScoreTransform may be set to an appropriate function by default. The user may modify the ScoreTransform when the user extends the framework with a new classifier for which a correct default transformation is not set by the framework or if the user wants to compare predictions from several models on a same scale. The following transformations (e.g., numeric one-to-one transformations on two-dimensional matrices) may be available to the user: doublelogit, identity, invlogit, ismax, logit, sign, symmetric, symmetricismax, symmetriclogit, etc. The user may assign either a function handle or a string to the ScoreTransform.

The classification model class may include ClassificationModel/predict according to the following syntax:
    function [labels,scores]=predict(this,X,varargin)
        % Get scores from the compact class
        scores=score(this,X,varargin{:});
        N=size(scores,1);
        % Transform scores and find the most probable class
        scores=this.PrivScoreTransform (scores);
        notNaN=~all(isnan(scores),2);
        [~,cls]=max(this.Prior);
        labels=repmat(this.ClassNames(cls),N,1);
        [~,classNum]=max(scores(notNaN,:),[ ],2);
        labels(notNaN)=this.ClassNames(classNum);
    end.
Class names may be stored in the classification model class as type ClassLabel.

The classification model class may include a property (e.g., loss). The loss property may be implemented with the following syntax:
    function l=loss(this,X,Y,varargin)
        [~,Sfit]=predict(this,X,extraArgs{:});
        C=classreg.learning,internal,classCount(this.ClassSummary.ClassNames,ClassLabel(Y));
        l=funloss(C,Sfit,W,this.Cost);
    end,
where C may include an N-by-K matrix of true class membership, and K may include a number of classes. The matrix (C) may be logical with one true and K−1 false per row. The classCount may be a utility for converting true labels (Y) into the matrix (C), and Sfit may include an N-by-K matrix of predicted scores. The framework may provide classification loss functions, such as classification error, exponential loss, binomial deviance loss, etc.

The classification model class may include a margin method and an edge method. Implementation of the margin and edge methods may be similar to that of the loss property. Basically, the margin and edge methods may call predict and may apply some type of funloss-like function.

In some implementations, the classification model class may accept types, such as char, cellstr, logical, categorical, numeric, etc. To treat the types consistently, the framework may utilize a class (e.g., ClassLabel). The ClassLabel may build on functionality of nominal. The nominal may provide the user with a new way of organizing data. The ClassLabel may be an internal tool, not intended for the user. The ClassLabel may permit a user to work with class labels without converting the class labels to a type understood by the framework understands and then back to a type selected by a user. The ClassLabel may store class labels internally and may returns the class labels to the user as a type originally supplied by the user.

The full classification regression model class may be a base class for full model classes in the framework. The full classification regression model class may store training data as a matrix (X) and weight vectors (Y) and (W). The vector (Y) may be stored in the full classification regression model class as a property (e.g., PrivY) with GetAccess=protected. For classification PrivY may be of type ClassLabel and for regression PrivY may be numeric. The full classification model class and the full regression model class may include a dependent Y property with the following access methods:
    FullClassificationModel:
    function y=get.Y(this)
        y=labels(this.PrivY);
    end
    FullRegressionModel:
    function y=get. Y(this)
        y=this.PrivY;
    end.
The full classification regression model class may include a ClassLabel/labels that converts labels from an internal representation to a type originally supplied by the user. The full classification regression model class may include an object (e.g., ModelParams), of class ParamsHolder, which may store all model-specific parameters, either supplied by the user or assumed by default. The full classification regression model class may include an abstract method (e.g., compact) that may be implemented in a concrete class. The full classification regression model class may include an abstract method (e.g., crossval) for cross-validation, which may return an object sub-classed from a partitioned model.

The full classification regression model class may include a method (e.g., FullClassificationRegressionModel/prepareDataCR) and two similar-purpose methods in (e.g., FullClassificationModel/prepareData and FullRegressionModel/prepareData) that may be used for data validity checks and pre-processing. The full classification regression model class may include data structure (e.g., dataSummary) with fields (e.g., PredictorNames, CategoricalPredictors, and ResponseName). The full classification regression model class may include a data structure (e.g., classSummary) with fields (e.g., ClassNames, NonzeroProbClasses, Prior, and Cost).

The full classification regression model class may include an object (e.g., ClassNames) of type ClassLabel, which may store a list of classes supplied by the user and/or found in the input Y data. A subset (e.g., NonzeroProbClasses) of these classes may include non-zero probabilities. A class may have zero probability because the user explicitly passes a zero prior value for this class or because the user assigns zero weights to all observations from the class. The full classification regression model class may include an abstract static fit method that is an interface for fitting any model in the framework.

The full regression model class may include a base class for all full regression models of the framework. The full regression model class may inherit predict, loss, and response from the regression model class. The full regression model class may include methods (e.g., resubPredict and resubLoss) for computing resubstitution predictions and loss according to the syntax:
    function [varargout]=resubPredict(this,varargin)
        [varargout{1:nargout}]=predict(this,this.X,varargin{:});
    end

```
function [varargout]=resubLoss(this,varargin)
    [varargout{1:nargout}]=loss (this,this.X,this.Y,'weights',
        this.W,varargin{:});
end.
```

The regression model class may provide one output from predict and loss, but the implementations for resubPredict and resubLoss may be more general so that a derived class may return an arbitrary number of output arguments. The derived class may re-implement predict and loss, but may not need to re-implement resubPredict and resubLoss. The full regression model class may include a concrete method (e.g., FullRegressionModel/crossval) that returns an object of type RegressionPartitionedModel.

The full classification model class may include a base class for all full classification models of the framework. The full classification model may be implemented in a similar manner as the full regression model class.

Figure 7C:
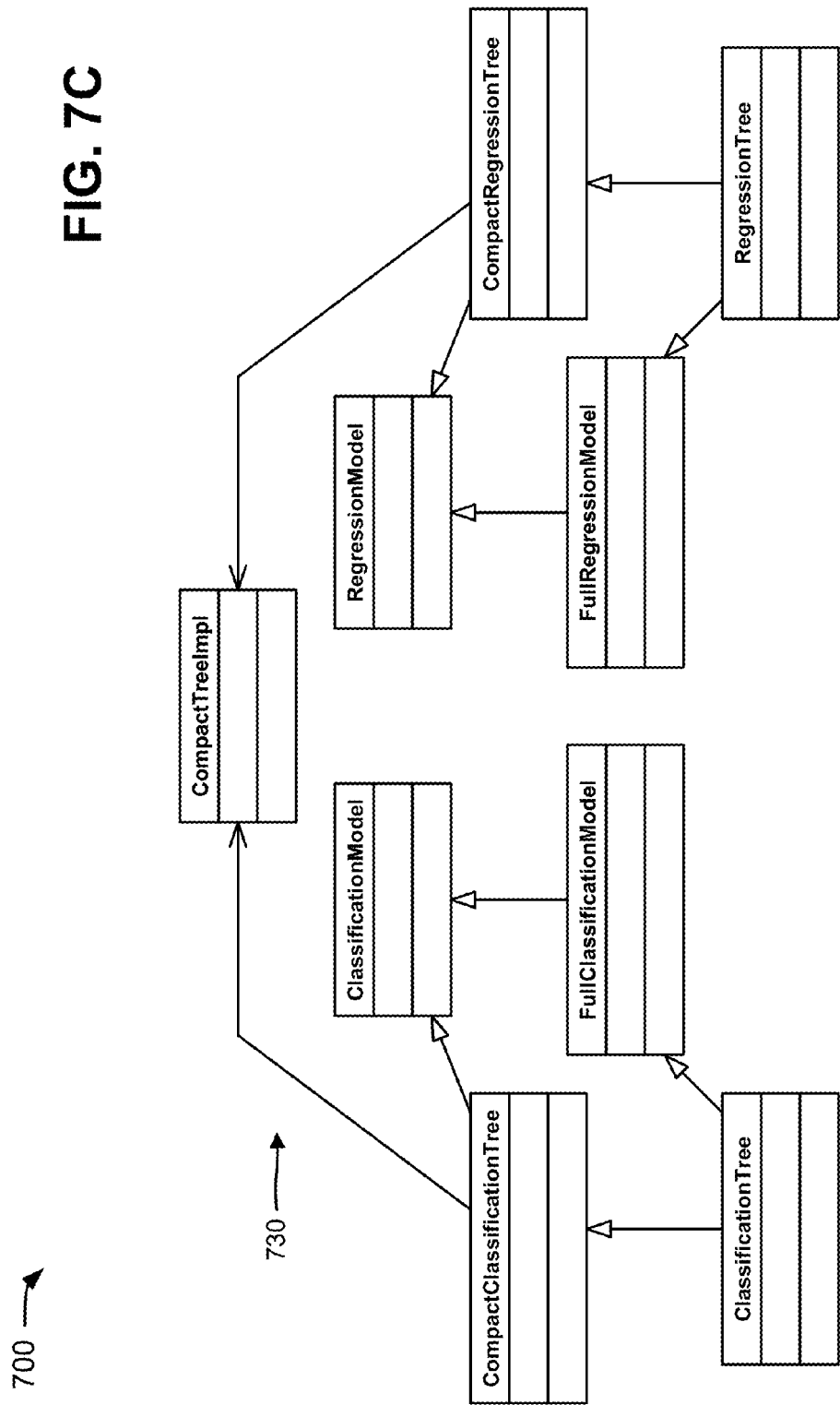

In some implementations, the framework may include a decision tree architecture 730, as shown in FIG. 7C. As shown, decision tree architecture 730 may include a compact tree implementation class (e.g., CompactTreeImpl), a compact classification tree class (e.g., CompactClassificationTree), a classification tree class (e.g., ClassificationTree), a compact regression tree class (e.g., CompactRegressionTree), a regression tree class (e.g., RegressionTree), the classification model class, the regression model class, the full classification model class, and the full regression model class. The classification model class, the regression model class, the full classification model class, and the full regression model class may include the features described above. Although not shown in FIG. 7C, decision tree architecture 730 may also include the predictor class and the full classification regression model class described above.

The compact tree implementation class may include a shared implementation for classification and decision trees. This implementation class may include properties and methods used by both classification and regression trees. For example, the compact tree implementation class may include a method (e.g., view) that calls either classregtree/disp or classregtree/view, a method (e.g., loss) that calls classregtree/test for loss values computed for a pruning sequence, a method (e.g., processSubtrees) that processes sub-tree arguments.

The compact classification tree class may include methods and properties that may be implemented as calls to a property (e.g., Impl or Impl.Tree) that is an instance of class CompactTreeImpl. The compact classification tree class may include a CompactClassificationTree/score, as well as a CompactRegressionTree/response, which return empty arrays. The compact classification tree class may compute model predictions with a method (e.g., CompactClassificationTree/predict) that overrides ClassificationModel/predict. The predict methods for decision trees may have special signatures. The predict method for classification may return class labels, scores (e.g., posterior class probabilities), node numbers, class numbers coded as integers, etc. The predict method may accept subtrees as an optional argument, which may permit users to request output for specific trees in a pruned sequence. If the user passes sub-tree indices, output arguments of the predict method may receive an extra dimension and may be filled for every sub-tree. The compact classification tree class may include a method (e.g., loss) that dispatches either to a method of a parent class (e.g., ClassificationModel/loss) or to classregtree/test.

The classification tree class may inherit methods and properties from the compact classification tree class. The classification tree class may include a property (e.g., ClassDecisionTree) that implements a static fit method using a pattern provided in FitTemplate. The classification tree class may implement a compact method by constructing an instance of CompactClassificationTree from an instance of CompactTreeImpl. The classification tree class may utilize a method (e.g., ClassificationTree/cvloss) to compute classification error by cross-validation. For example, a user may execute ClassificationTree/cvloss to find an optimal pruning level by cross-validation. The ClassificationTree/cvloss method may belong in the full class since the method cross-validates on stored X and Y data. The classification tree class may include a constructor (e.g., ClassificationTree) for growing an actual decision tree.

The compact regression tree class may include features similar to the features of the compact classification tree class, described above. The regression tree class may include features similar to the features of the classification tree class.

Figure 7D:
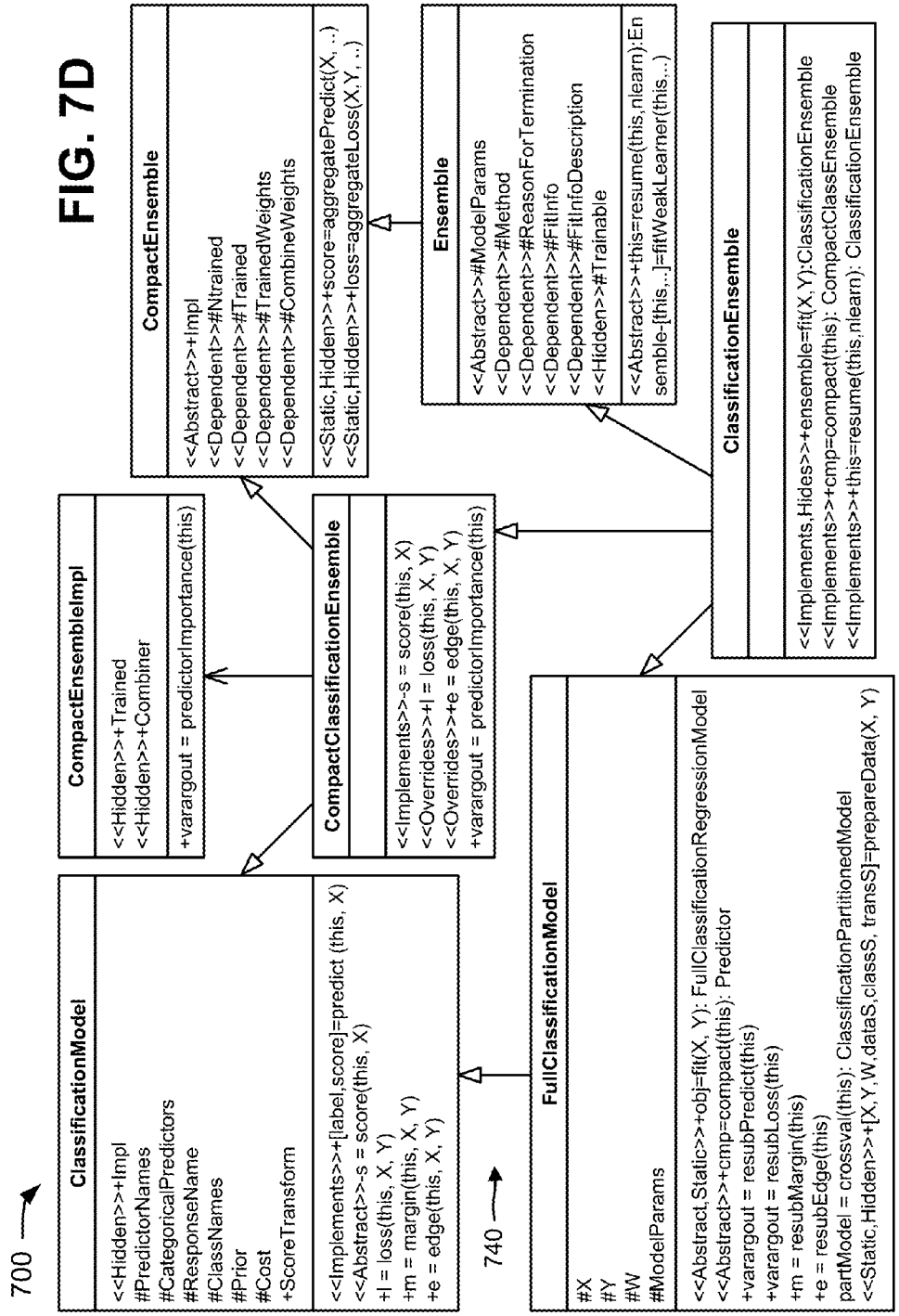

In some implementations, the framework may include an ensemble architecture 740, as shown in FIG. 7D. As shown, ensemble architecture 740 may include a compact ensemble implementation class (e.g., CompactEnsembleImpl), a compact ensemble class (e.g., CompactEnsemble), a compact classification ensemble class (e.g., CompactClassificationEnsemble), an ensemble class (e.g., Ensemble), a classification ensemble class (e.g., ClassificationEnsemble), the classification model class, and the full classification model class. The classification model class and the full classification model class may include the features described above. Although not shown in FIG. 7D, ensemble architecture 740 may also include the predictor class, the regression model class, the full regression model class, and the full classification regression model class described above. Although not shown in FIG. 7D, ensemble architecture 740 may also include a compact regression ensemble class (e.g., CompactRegressionEnsemble) and a regression ensemble class (e.g., RegressionEnsemble).

The compact ensemble implementation class may include a cell array (e.g., Trained) of trained weak learners, and an object (e.g., Combiner) used to combine predictions from the trained weak learners. The compact ensemble implementation class may include a method (e.g., predictorImportance) that sums estimates of predictor importance over the weak learners. This method may return a vector of predictor importance ranks, with one rank per predictor.

The compact ensemble class may provide protected dependent properties wrapped to a property (e.g., Impl). Declaring an abstract property (e.g., Impl) in the compact ensemble class may force concrete descendants of this class to be derived from another class with a concrete Impl. The compact ensemble class may include static hidden methods that may be used by ensembles to do work behind the scenes (e.g., check a validity of input arguments, aggregate predictions from weak learners into an overall ensemble prediction, etc.).

The compact classification ensemble class may implement a score method and may not need to override ClassificationModel/predict and ClassificationModel/margin. The compact classification ensemble class may include methods (e.g., loss and edge) that allow optional arguments, such as learners, specific to ensembles. The compact classification ensemble class may include a call (e.g., predictorImportance) to CompactEnsembleImpl/predictorImportance.

The ensemble class may include properties and methods common to full ensemble objects. The ensemble class may inherit the properties from the compact ensemble class, and may include dependent properties obtained from the ModelParams property. The ensemble class may include a cell array (e.g., Trainable) of full weak learner objects. In some implementations, the Trainable cell array may be filled for cross-validated ensembles. In this case, an instance of the classification ensemble class may store learners for cross-validation folds, such as one element of an array (e.g., Trained) and one element of the Trainable cell array per fold. The Trained array may store an array of trained ensembles (e.g., compact classification ensemble objects), and the Trainable cell array may store an array of trainable ensembles (e.g., classification ensemble objects). The ensemble class may include an abstract method (e.g., resume) that provides an interface for accumulating more training cycles (i.e., adding more weak learners to the ensemble). The ensemble class may also include a protected method (e.g., fitWeakLearners) that performs the actual training of the ensemble by looping through weak learner templates and applying the templates to properly modified training data.

In some implementations, the ensemble class may be a class for full ensembles for classification, and may implement fit, compact, and resume. The ensemble class may inherit methods, such as predict, resubPredict, etc. from the full classification model class. The ensemble class may inherit methods, such as edge and loss, from the full classification model class and the compact classification ensemble class.

The ensemble class may implement a static fit using a pattern provided by FitTemplate. The static fit (e.g., ClassificationEnsemble.fit) may be hidden but may be called by the user. The ensemble class may adjust prior class probabilities for cost-sensitive learning prior to growing weak classifiers. Regression classes (not shown in FIG. 7D) may be symmetric to the classification classes. However, a regression ensemble class may also include more methods (e.g., regularize, shrink, and cvshrink) than the classification ensemble class.

In the framework, fitting may be implemented using a factory operating on learner templates. For example, ClassificationTree/fit may be implemented as:

function this=fit(X,Y,varargin)
    temp=FitTemplate.make('Tree','type','classification',varargin{:});
    this=fit(temp,X,Y);
end.

Similarly, fitensemble may be implemented as:

function obj=fitensemble(X,Y,method,nlearn,learners,varargin)
    temp=FitTemplate.make(method,'nlearn',nlearn,'learners',learners,varargin{:});
    obj=fit(temp,X,Y);
end.

An ensemble learner typically applies the same weak model with the same parameters over and over again to the modified (e.g., re-sampled, reweighted, etc.) training data. Thus, the framework may implement an object (template) for a model with its parameters before the model is applied to the data. The template may not store training data but may know how to construct a trained object for the model once the training data is supplied.

A factory pattern may mean that for every class (e.g., ClassificationTree) there needs to be another class (e.g., ClassificationTreeTemplate) that knows how to create the first class. In the framework, a proliferation of classes may be avoided by introducing naming conventions for learner classes and classes/methods used to process model parameters. For example, the following code may show how FitTemplate.make prepares functions to be called when a simple learner object (e.g., ClassificationTree) needs to be constructed on input data:

this.MakeModelParams=str2func([this.Method'Params.make']);
    if strcmp(this.Type,'classification')
        this.MakeFitObject=str2func
            (['Classification'this.Method]);
    else
        this.MakeFitObject=str2func
            (['Regression'this.Method]);
    end
    [this.ModelParams,this.BaseFitObjectArgs]= . . .
        this.MakeModelParams(this.Type,this.MakeModelInputArgs{:}), where this.MakeModelParams and this.MakeFitObject may be stored in the template object and may be returned by FitTemplate.make. When FitTemplate/fit is invoked on supplied data (e.g., X and Y), FitTemplate/fit may execute:

obj=this.MakeFitObject(X,Y,W,this.ModelParams,fitArgs{:})

to return an object of type ClassificationTree.

In the framework, every learner may include a respective Params class. The Params class for decision trees and ensembles may include an abstract class (e.g., ModelParams) that provides a common interface. The Params class may include a Type (e.g., classification or regression) and a Method that is a name of the model. The Params class may include a static method (e.g., make) that extracts arguments specific to a concrete model from varargin, constructs a ModelParams object for the concrete model, and returns all unrecognized arguments as extraArgs. The Params class may include a method (e.g., fillDefaultArgs) that is called on an instance of a ModelParams class by the constructor of the base class for full models. This method may locate empty properties and may fill them with reasonable non-empty default values. The method may take training data as input because default values for these properties may depend on the training data.

The Params class may include objects (e.g., Generator and Modifier) used to generate training data for the next weak learner and modify this training data after this weak learner is trained. These objects may save parameters for data generation and modification (either supplied by the user or assumed by default), and may save information accumulated in the process of training weak learners.

In some implementations, the framework may generate training data for weak learners using ensemble data generation classes. The ensemble data generation classes may include a base class (e.g., Generator) that saves training data supplied by the user as X, Y, and W. The ensemble data generation classes may include optional data (e.g., FitData) for every weak learner. The ensemble data generation classes may include an accumulated number (T) of data-generation cycles. After training is completed, the accumulated number may be equal to a number of grown weak learners (e.g., NTrained). The ensemble data generation classes may include a logical matrix (e.g., UseObsForIter) of size N-by-T. An element (i, j) of this matrix may be true if observation (i) is used for iteration (j), and may be false otherwise. This matrix may be used for computing out-of-bag and cross-validated information.

The ensemble data generation classes may include a method (e.g., generate) that generates training data at every iteration and saves an updated generator state. The ensemble data generation classes may include a method (e.g., update) that updates the data (X, Y, W, and FitData) to be used for a next generation cycle. The update method may be called every time after a weak learner is trained, and may be used to update training data using output from a current weak learner.

The ensemble data generation classes may include a class (e.g., BlankGenerator) that is a simple concrete class with trivial implementations of the generate and update methods. The ensemble data generation classes may include a class (e.g., Resampler) that generates data by resampling. The ensemble data generation classes may include a class (e.g., Partitioner) partitions data into folds for cross-validation. The Resampler and Partitioner classes may include static processArgs methods for processing input arguments related to data generation.

In some implementations, the framework may modify the training data by weak learners. Modification of the training data by a weak learner may be needed for boosting. In the framework, classes for data modification may be named after respective algorithms. The data modification classes may include an array (e.g., FitInfo) with a first dimension of length (T). The FitInfo array may have many dimensions and may be used for storing information accumulated during training.

The data modification classes may include strings (e.g., FitInfoDescription and ReasonForTermination) for informing users about what is in the FitInfo array and why the ensemble algorithm has stopped, respectively. The data modification classes may include a number (T) of learning iterations performed by a Modifier class, and may be equal to NTrained. The data modification classes may include a rate (e.g., LearnRate) of shrinkage. The data modification classes may include a method (e.g., modify) that updates training data and a state of an algorithm at every learning iteration. The modify method may include a logical flag (e.g., mustTerminate) that instructs a routine calling Modifier/modify that training must stop. The modify method may also include X, Y, W, fitData, and a compact object (H) for a weak hypothesis constructed at a last learning step.

The data modification classes may include a method (e.g., makeCombiner) that returns an object of type Combiner. This object may be used by a compact trained model to combine predictions from weak learners. The data modification classes may include a blank modifier class (e.g., BlankModifier) that provides implementations of two abstract methods and one abstract property. The blank modifier may be used, for example, for bagging. A bagged ensemble may be grown by resampling data at every learning step, but no data modification may be performed.

In some implementations, the framework may combine predictions from weak learners in an ensemble using a weighted sum or a weighted average. For ensembles, the framework may monitor, for example, how classification error, or other forms of loss, depends on the ensemble size. For example, for one-hundred weak learners, the framework may compute a classification error from learner 1, then classification errors from learners 1:2, etc. until learners 1:100. The framework may aggregate predictions from individual learners into an overall prediction using static hidden method (e.g., CompactEnsemble.aggregatePredict) according to the following syntax:
    for t=1:T
    [combiner,score]= . . .
        CompactEnsemble.predictOneWithCache(combiner,X,
            learnerIdx(t), . . .
        usenfort,trained,classnames,nonzeroProbClasses,defaultScore);
    end,
where the for loop may execute over T trained weak learners. A static hidden method (e.g., CompactEnsemble.predictOneWithCache) may include the following syntax:
    combiner=updateCache(combiner,score,t,usenfortT);
    score=cachedScore(combiner),
where usenfortT may include a logical matrix indicating what observations may be used for a particular learner, and score may include an accumulated score from all previous weak learners. The updateCache method may implement a running average algorithm, and the cachedScore method may return an up-to-date classification score or a fitted regression response.

In some implementations, the framework may grow ensembles by resampling. In addition to predict and resubPredict provided by a trained model, ensembles grown by resampling, by the framework, may provide an out of bag predict method (e.g., oobPredict), an out of bag loss method (e.g., oobloss), an out of bag margin method (e.g., oobmargin), an out of bag edge method (e.g., oobedge), etc.

The framework may provide a bagged ensemble class (e.g., BaggedEnsemble). Any ensemble grown by resampling may be derived from the bagged ensemble class, and that bagged ensemble class may expose properties of a method (e.g., Resampler) to the user. Concrete properties of the Resampler may be exposed as dependent properties of the bagged ensemble as follows:
    function fresample=get.FResample(this)
        fresample=this.ModelParams.Generator.FResample;
    end,
where a property (e.g., ModelParams) may be abstract in the bagged ensemble class and concrete in full classification model class.

In some implementations, the ensemble class and its derivatives (e.g., ClassificationEnsemble and RegressionEnsemble) may provide most of the functionality needed for cross-validation. A cross-validation model may be thought of as an ensemble with one learner per fold. A property (e.g., UseObsForIter) of the Generator method may keep record of what observations are used for what learners, and this record may be used to compute cross-validated information. A partitioned model class (e.g., PartitionedModel) may implement the Adapter pattern, and may define an interface for cross-validated models. The partitioned model class may enable the user to determine whether a model is a cross-validated model, and may expose relevant properties and methods of the ensemble and partitioned data to the user.

In some implementations, the framework may include a classification partitioned model class and regression partitioned model class for simple (non-ensemble) partitioned models. The classification partitioned model class may add classification-specific properties and classification-specific methods that are implemented as wrapped calls to respective methods of the ensemble class.

In example 700, further assume that the framework inspects performance of the trained model based on training, cross-validation, out-of-bag, independent, etc. test data. In some implementations, the framework may inspect a structure of the trained model (e.g., a decision tree structure) and/or fit information (e.g., errors produced by weak hypotheses). For example, the framework may inspect full objects, compact objects, classification objects, and regression objects associated with the trained model. The framework may reduce a size of the trained model by shrinking (or pruning) the trained model. In some implementations, the framework may provide pruning for regression ensembles by a lasso technique.

The framework may determine whether to resume training on the trained model after reducing the size of the trained model. For example, if the framework determines that training is to be resumed on the trained model, the framework may resume training of the ensemble if the performance does not satisfy particular criteria. If the framework determines that training is not to be resumed on the trained model, the framework may output a final object based on the trained model. In some implementations, client device 210/TCE 240 may output a representation of the final object that, when selected, may cause client device 210/TCE 240 to provide access to the final object, as shown in a user interface 750 of FIG. 7E.

Figure 7E:
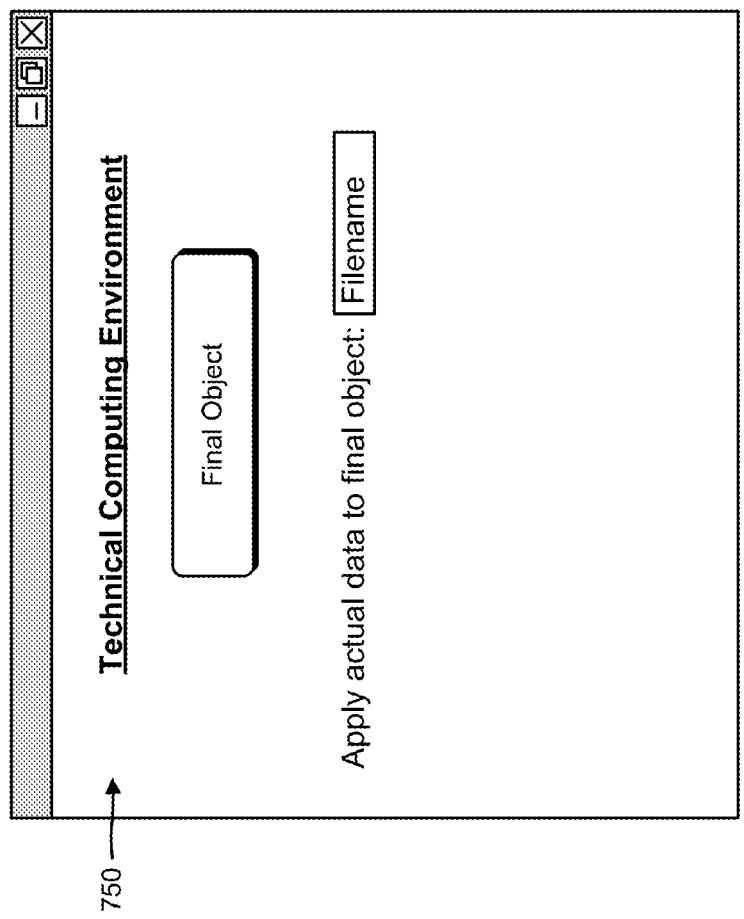

As further shown in FIG. 7E, client device 210/TCE 240 may request, via user interface 750, that the user identify or provide actual data for the final object. The user may identify or provide the actual data to client device 210/TCE 240, and client device 210/TCE 240 may apply the final object to the actual data. The final object may process the actual data to produce predicted results. Client device 210/TCE 240 may provide the predicted results for display to the user, as shown in a user interface 760 of FIG. 7F.

CONCLUSION

Systems and/or methods described herein may provide a classification/regression framework that provides models for ensemble learning, classification, and/or non-parametric regression. The classification/regression framework may provide a common API so that a user of the framework may provide training data to the framework. The classification/regression framework may utilize the training data to produce a final object for the user. The user may apply the final object to actual data in order to generate predicted results. The systems and/or methods may enable the user to add one or more new models to the classification/regression framework, and thus, extend the framework.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. A method comprising:
interacting with a selection of a classification and regression framework,
the classification and regression framework providing a plurality of learning algorithms, and
the interacting with the selection being performed by a device;
applying training data to the classification and regression framework to generate a first trained model,
the training data including information to discover predictive relationships,
the first trained model including a plurality of trained learning algorithms, and
the applying the training data being performed by the device;
reducing, based on weights associated with the plurality of trained learning algorithms, a size of the first trained model to form a second trained model including fewer trained learning algorithms than the first trained model,
the reducing the size of the first trained model including removing at least one of the plurality of trained learning algorithms from the first trained model, and
the reducing the size of the first trained model being performed by the device;
generating a compact object, for use in producing predicted results and based on the second trained model, that does not include the training data,
the generating the compact object being performed by the device; and
providing the compact object for display,
the providing the compact object for display being performed by the device.
2. The method of claim 1, further comprising:
storing the compact object.
3. The method of claim 1, further comprising:
applying the compact object to data;
generating, via the compact object, the predicted results for the data; and
providing the predicted results for display.
4. The method of claim 1, further comprising:
receiving a request to add a new model to the classification and regression framework;
creating, based on the request, a first class that determines predictions of the new model based on particular data;
creating a second class that stores input parameters for the new model;
creating a third class that builds the new model based on training data and class labels; and
adding the new model, the first class, the second class, and the third class to a set of models of the classification and regression framework.

5. The method of claim 4, further comprising:
creating a standalone model, for the new model, based on the classification and regression framework,
the standalone model providing functionality without the classification and regression framework; and
storing the standalone model.

6. The method of claim 1, where the classification and regression framework is associated with a technical computing environment.

7. A non-transitory computer-readable medium storing instructions, the instructions comprising:
one or more instructions that, when executed by a processor of a device, cause the processor to:
interact with a selection of a classification and regression framework,
the classification and regression framework providing a plurality of learning algorithms,
apply training data to the classification and regression framework to generate a first trained model,
the training data including information to discover predictive relationships, and
the first trained model including a plurality of trained learning algorithms,
reduce, based on weights associated with the plurality of trained learning algorithms, a size of the first trained model to form a second trained model including fewer learning algorithms than the first trained model,
the reducing the size of the first trained model including removing at least one of the plurality of trained learning algorithms from the first trained model,
generate a compact object, for producing predicted results and based on the second trained model, that does not include the training data, and
provide the compact object for display.

8. The non-transitory computer-readable medium of claim 7, where the instructions further comprise:
one or more instructions that, when executed by the processor, cause the processor to:
store the compact object.

9. The non-transitory computer-readable medium of claim 7, where the instructions further comprise:
one or more instructions that, when executed by the processor, cause the processor to:
apply the compact object to data,
generate, via the compact object, the predicted results for the compact object, and
provide the predicted results for display.

10. The non-transitory computer-readable medium of claim 7, where the instructions further comprise:
one or more instructions that, when executed by the processor, cause the processor to:
receive a request to add a new model to the classification and regression framework,
create, based on the request, a first class that determines predictions of the new model based on particular data,
create a second class that stores input parameters for the new model,
create a third class that builds the new model based on training data and class labels, and
add the new model, the first class, the second class, and the third class to a set of models of the classification and regression framework.

11. The non-transitory computer-readable medium of claim 10, where the instructions further comprise:
one or more instructions that, when executed by the processor, cause the processor to:
create a standalone model, for the new model, based on the classification and regression framework,
the standalone model providing functionality without the classification and regression framework, and
store the standalone model.

12. The non-transitory computer-readable medium of claim 11, where the instructions further comprise:
one or more instructions that, when executed by the processor, cause the processor to:
provide the standalone model for display.

13. The non-transitory computer-readable medium of claim 7, where the classification and regression framework is associated with a technical computing environment.

14. A device comprising:
one or more processors to:
interact with a selection of a classification and regression framework,
the classification and regression framework providing a plurality of learning algorithms,
apply training data to the classification and regression framework to generate a first trained model,
the training data including information to discover predictive relationships, and
the first trained model including a plurality of trained learning algorithms,
reduce, based on weights associated with the plurality of trained learning algorithms, a size of the first trained model to generate a second trained model including fewer trained learning algorithms than the first trained model,
the reducing the size of the first trained model including removing at least one of the plurality of trained learning algorithms from the first trained model,
generate a compact object, for producing predicted results and based on the second trained model, that does not include the training data, and
provide the compact object for display.

15. The device of claim 14, where the one or more processors are further to:
store the compact object.

16. The device of claim 14, where the one or more processors are further to:
apply the compact object to data,
generate, via the compact object, the predicted results for the data, and
provide the predicted results for display.

17. The device of claim 14, where the one or more processors are further to:
receive a request to add a new model to the classification and regression framework,
create, based on the request, a first class that determines predictions of the new model based on particular data,
create a second class that stores input parameters for the new model,
create a third class that builds the new model based on training data and class labels, and
add the new model, the first class, the second class, and the third class to a set of models of the classification and regression framework.

18. The device of claim 17, where the one or more processors are further to:
  create a standalone model, for the new model, based on the classification and regression framework,
    the standalone model providing functionality without the classification and regression framework, and
  store the standalone model.

19. The device of claim 14,
  where the one or more processors are further to:
    determine the weights for the plurality of trained learning algorithms, and
  where the one or more processors, when reducing the size of the first trained model, are to:
    remove a trained learning algorithm, from the plurality of learning algorithms, with an optimized weight, of the weights, below a threshold weight.

20. The method of claim 1, further comprising:
  determining to train the second trained model after reducing the size of the first trained model; and
  selectively training the second trained model after determining to train the second trained model.

* * * * *